(12) United States Patent
Haidar et al.

(10) Patent No.: US 12,505,351 B2
(45) Date of Patent: Dec. 23, 2025

(54) METHODS, DEVICES AND MEDIA FOR IMPROVING KNOWLEDGE DISTILLATION USING INTERMEDIATE REPRESENTATIONS

(71) Applicants: Md Akmal Haidar, Montreal (CA); Mehdi Rezagholizadeh, Montreal (CA)

(72) Inventors: Md Akmal Haidar, Montreal (CA); Mehdi Rezagholizadeh, Montreal (CA)

(73) Assignee: HUAWEI TECHNOLOGIES CO., LTD., Shenzhen. (CN)

( * ) Notice: Subject to any disclaimer, the term of this patent is extended or adjusted under 35 U.S.C. 154(b) by 1210 days.

(21) Appl. No.: 17/233,323

(22) Filed: Apr. 16, 2021

(65) Prior Publication Data

US 2022/0335303 A1    Oct. 20, 2022

(51) Int. Cl.
*G06N 3/045* (2023.01)
*G06N 3/084* (2023.01)
*G06N 3/088* (2023.01)

(52) U.S. Cl.
CPC ............. *G06N 3/088* (2013.01); *G06N 3/045* (2023.01); *G06N 3/084* (2013.01)

(58) Field of Classification Search
CPC ........ G06N 3/088; G06N 3/045; G06N 3/084; G06N 3/096; G06N 3/082
See application file for complete search history.

(56) References Cited

U.S. PATENT DOCUMENTS

| | | | | |
|---|---|---|---|---|
| 11,373,390 B2* | 6/2022 | Zhao | ................... | G06F 18/2413 |
| 11,586,930 B2* | 2/2023 | Meng | ..................... | G10L 15/16 |
| 11,610,393 B2* | 3/2023 | Kuen | ........................ | G06T 3/60 |
| 11,961,003 B2* | 4/2024 | David | ..................... | G06N 3/045 |
| 2016/0078339 A1* | 3/2016 | Li | ........................... | G06N 3/082 706/20 |
| 2018/0268292 A1* | 9/2018 | Choi | ..................... | G06V 10/454 |
| 2019/0043003 A1* | 2/2019 | Fisher | .................... | G06V 10/82 |

(Continued)

FOREIGN PATENT DOCUMENTS

| | | | | |
|---|---|---|---|---|
| CN | 112508169 | * | 3/2021 | ............. G06N 20/00 |
| CN | 112508169 A | | 3/2021 | |

(Continued)

OTHER PUBLICATIONS

J. Devlin, M-W. Chang, K. Lee, and K. Toutanova, "BERT: Pre-training of Deep Bidirectional Transformers for Language Understanding", 2019, https://arxiv.org/abs/1810.04805.

(Continued)

*Primary Examiner* — Phenuel S Salomon

(57) ABSTRACT

Methods, devices and processor-readable media for knowledge distillation using intermediate representations are described. A student model is trained using a Dropout-KD approach in which intermediate layer selection is performed efficiently such that the skip, search, and overfitting problems in intermediate layer KD may be solved. Teacher intermediate layers are selected randomly at each training epoch, with the layer order preserved to avoid breaking information flow. Over the course of multiple training epochs, all of the teacher intermediate layers are used for knowledge distillation. A min-max data augmentation method is also described based on the intermediate layer selection of the Dropout-KD training method.

20 Claims, 11 Drawing Sheets

(56) References Cited

U.S. PATENT DOCUMENTS

| | | | | |
|---|---|---|---|---|
| 2020/0364542 | A1* | 11/2020 | Sun | G06N 3/084 |
| 2021/0279595 | A1* | 9/2021 | Sridhar | G06N 3/084 |
| 2022/0165373 | A1* | 5/2022 | Kim | G06F 40/30 |
| 2022/0269868 | A1* | 8/2022 | Song | G06N 3/049 |
| 2022/0344049 | A1* | 10/2022 | Hall | G06N 3/048 |
| 2022/0374710 | A1* | 11/2022 | Kim | G06N 3/045 |

FOREIGN PATENT DOCUMENTS

| | | |
|---|---|---|
| CN | 113281048 A | 8/2021 |
| CN | 113326941 A | 8/2021 |
| CN | 113435208 A | 9/2021 |

OTHER PUBLICATIONS

G. Hinton, O. Vinyals, and J. Dean, "Distilling the Knowledge in a Neural Network", 2014, NIPS Workshop, https://arxiv.org/abs/1503.02531.

I. Tenney, D. Das, and E. Pavlick, "BERT Rediscovers the Classical NLP Pipeline", 2019, arXiv preprint arXiv:1905.05950.

O. Kovaleva, A. Romanov, A. Rogers, and A. Rumshisky, "Revealing the Dark Secrets of BERT", 2019, arXiv preprint arXiv:1908.08593.

S. Sun, Y. Cheng, Z. Gan, and J. Liu, "Patient Knowledge Distillation for BERT Model Compression", 2019, https://arxiv.org/abs/1908.09355.

Y. Wu, P. Passban, M. Rezagholizadeh, and Q. Liu, "Why Skip If You Can Combine: A Simple Knowledge Distillation Technique for Intermediate Layers", 2020, https://arxiv.org/abs/2010.03034.

P. Passban, Y. Wu, M. Rezagholizadeh, and Q. Liu, "ALP-KD: Attention-Based Layer Projection for Knowledge Distillation", 2020, https://arxiv.org/abs/2012.14022.

S. Sun, Z. Gan, Y. Cheng, Y. Fang, S. Wang, and J. Liu, "Contrastive Distillation on Intermediate Representations for Language Model Compression", Proceedings of the 2020 Conference on Empirical Methods in Natural Language Processing, Nov. 2020, pp. 498-508.

H. Fu, S. Zhou, Q. Yang, J. Tang, G. Liu, K. Liu, and X. Li, "LRC-BERT: Latent-representation Contrastive Knowledge Distillation for Natural Language Understanding", Association for the Advancement of Artificial Intelligence, 2021.

X. Jiao, Y. Yin, L. Shang, X. Jiang, X. Chen, L. Li, F. Wang, and Q. Liu, "TinyBERT: Distilling BERT for Natural Language Understanding", 2019, arXiv preprint arXiv:1909.10351.

A. Asadian and A. Salehi-Abari, "Distilling Knowledge via Intermediate Classifier Heads", 2021, https://arxiv.org/abs/2103.00497.

A. Radford, J. Wu, R. Child, D. Luan, D. Amodei, and I. Sutskever, "Language Models are Unsupervised Multitask Learners", 2019, https://cdn.openai.com/better-language-modelslanguage_models_are_unsupervised_multitask_learners.pdf.

A. Jafari, "Improved Knowledge Distillation by Utilizing Backward Pass Knowledge in Neural Networks", 2020.

A. Wang, A. Singh, J. Michael, F. Hill, O. Levy, and S. R. Bowman, "GLUE: A Multi-Task Benchmark and Analysis Platform for Natural Language Understanding", 2018, arXiv preprint arXiv:1804.07461.

Y. Tian, D. Krishnan, and P. Isola, "Contrastive Representation Distillation", 2019, arXiv preprint arXiv:1910.10699.

D. E. Rumelhart, G. E. Hinton, and R. J. Williams, "Learning representations by back-propagating errors", 1986, https://www.iro.umontreal.ca/~vincentp/ift3395/lectures/backprop_old.pdf.

E. Jang, S. Gu, and B. Poole, "Categorical Reparameterization with Gumbel-Softmax", 2016, arXiv preprint arXiv:1611.01144.

* cited by examiner

METHODS, DEVICES AND MEDIA FOR IMPROVING KNOWLEDGE DISTILLATION USING INTERMEDIATE REPRESENTATIONS

TECHNICAL FIELD

The present disclosure generally relates to knowledge distillation, and in particular to methods, devices and processor readable media for improving knowledge distillation using intermediate representations.

BACKGROUND

Machine Learning (ML) is an artificial intelligence technique in which algorithms are used to build a model from sample data that is capable of being applied to input data to perform a specific inference task (i.e., making predictions or decisions based on new data) without being explicitly programmed to perform the specific inference task. Deep learning is one of the most successful and widely deployed machine learning algorithms. In deep learning, artificial neural networks typically consist of layers of non-linear parametric functions or "neurons". To train the neural network using supervised learning, data samples are received by an input layer of the network and are processed by the neurons of the network to generate an output, such as inference data, at an output layer of the network. This is called forward propagation. The output pf the network is compared to semantic information associated with the data samples, such as semantic labels indicating a ground truth that can be compared to the inference data generated by the network. Training the neural network involves optimizing the learnable parameters of the neurons, typically using gradient-based optimization algorithms, to minimize a loss function. This process is called backpropagation. A particular configuration or architecture of an artificial neural network, or simply neural network (NN) is commonly referred to as a neural network model.

Typically neural network models trained using supervised learning consist of upwards of billions of parameters and are therefore cumbersome to deploy, because storing the parameters and running these neural network models on resource constrained computing devices (e.g. computing devices having limited computing resources), such as mobile devices, embedded devices, or edge devices, is infeasible. Therefore, a variety of model compression and acceleration techniques have been developed to reduce either the number of parameters, or the memory required to store each parameter, of a neural network model prior to deployment on computing devices with limited computing resources.

Knowledge Distillation (KD) is a compression technique used to transfer the knowledge of a large trained neural network model (i.e. a neural network model with many learned parameters) to a smaller neural network model (i.e. a neural network model with fewer learned parameters than the large trained neural network model). KD utilizes the generalization ability of the larger trained neural network model (referred to as the "teacher model" or "teacher") using the inference data output by the larger trained model as "soft targets", which are used as a supervision signal for training a smaller neural network model (called the "student model" or "student"). This technique stands in contrast to conventional supervised training of a neural network model, in which "hard targets" corresponding to the ground truth reflected in labelled training data of a training dataset are used as the sole supervision signal to train the neural network model.

In KD, the student receives both soft targets and hard targets as supervision signals. This allows the student to achieve better performance after being trained on the same dataset as the teacher, as the soft targets provide higher entropy and less variance (i.e. better generalization) than the hard targets. A generalized technique for knowledge distillation is described by Geoffrey Hinton, Oriol Vinyals and Jeff Dean in *Distilling the Knowledge in a Neural Network*, https://arxiv.org/abs/1503.02531.

FIG. 1 shows a typical configuration 10 for conventional KD. A teacher 20 is used to train a student 30. The teacher 20 receives input data 22 of a labeled data samples obtained from a dataset used to train the student 30 and generates teacher inference data 24) based on the input data 22. The teacher inference data 24 is used as a soft target for supervision of the student 30, and the student 30 may be trained at least in part using a knowledge distillation loss function based on a comparison of the teacher inference data 24 to the student inference data 34 based on the same input data 22 provided to the teacher 20.

The teacher 20 typically has high prediction accuracy for a given inference task, or scores highly on some other relevant metric, but is too computationally intensive for practical deployment to computing devices with limited computing resources. The student 30, on the other hand, may reasonably be deployed to a computing device with limited computing resources (e.g. memory, processing power, processing cores, cache, etc.). The teacher 20 is pre-trained, and the student 30 is generally trained using the same training dataset used to train the teacher 20; however, this pre-training of the teacher 20 is not always necessary. KD proposes training the student 30 using two different sources of supervision: first, the labels of the labeled data samples in the training dataset (used to determine a ground truth loss), and second, the outputs (i.e. teacher inference data 24) of the teacher 20 (used to determine a knowledge distillation loss, as described above). Typically, the outputs of teacher 20 (i.e., teacher inference data 24) which provide a supervision signal to the student 30 are the logits generated (i.e. predicted) by the teacher 20, i.e. the predictions of the teacher 20 prior to normalization using a softmax function. The logits generated by the teacher 20 ("the teacher predicted logits") contain some so-called "dark knowledge" of the teacher 20, which can be used as a "soft label" to provide information about the relative differences between the probabilities of various predictions, which the teacher 20 has been trained to generate (e.g. different classes for a classification task). Evidence shows that the student model tends to benefit from this dark knowledge.

As described above, a teacher typically has more learnable parameters than a student. These learnable parameters are typically organized into structures such as layers or blocks, which are organized in series such that the output of one layer or block feeds to the next layer or block as input. Accordingly, a teacher typically has a greater number of layers or functional blocks than a student, resulting in a greater number of layer or block outputs used as inputs by subsequent layers or blocks. The layer or block output of each intermediate layer may be referred to as intermediate representation, as it represents the information being processed by the model at a given intermediate layer between the input layer and the output layer of the teacher model. The intermediate representations may be referred to as activation maps or feature maps.

As described above, the eacher and the student each typically generate (i.e. predict) an output in the form of logits, i.e. a non-normalized probability distribution. The predicted logits of the teacher model and the student model are then typically normalized by a softmax function to generate a normalized probability distribution, which may be used as the final prediction of the model (e.g., a model trained to perform a classification task using images as input may generate a normalized probability distribution of ("dog"=0.9, "cat"=0.1)). Conventional KD involves knowledge of the predicted logits of the teacher being transferred to the student by minimizing a loss function between the predicted logits output by the teacher and the predicted logits output by the student. However, the outputs of the intermediate layers of the teacher (i.e. the outputs of each layer prior to the last layer) may also carry important information, such as linguistic knowledge for NLP tasks or feature information for CV tasks, which can also help in improving KD performance (i.e. improving the training of the student) and better generalization than conventional KD. In addition, an intermediate layer of the teacher may include other useful information, such as attention weights applied the intermediate layer or mapping functions (e.g., classifiers) used by the intermediate layer. All of this information may be encoded into the intermediate representation of the intermediate layer.

Several different approaches have been proposed for distilling knowledge from the intermediate representations of the teacher to the student during training of the student. However, these existing approaches exhibit limitations in how they select which intermediate representations of the teacher should be used to distill knowledge during training of the student.

Because the teacher typically has more intermediate layers than the student, some existing approaches select m intermediate layers from n intermediate layers of the teacher (m<<n), wherein m is the number of intermediate layers of the student, and use the intermediate representations of the m selected teacher layers to distill knowledge to the m layers of the student during training of the student. This necessarily means that some intermediate layers of the teacher must be ignored when distillation is performed (i.e. when knowledge is distilled from the teacher to the student during training). Selecting some intermediate layers to use and other to ignore leads to two problems which can be defined as the skip problem and the search problem.

The skip problem simply means that the important information encoded in the intermediate representations output by the (n-m) ignored intermediate layers of the teacher do not contribute (or distill) knowledge to student. If the m intermediate teacher layers are selected arbitrarily, important intermediate representations of the ignored intermediate layers of the teacher may go unused and not contribute (or distill) knowledge to the student.

The search problem means that, if only a subset of the intermediate layers of the teacher are used to contribute (or distill) knowledge to the student, the specific layers included in this subset should be the most valuable or useful layers which should be used to contribute (or distill) knowledge to the student, and those specific (i.e. valuable) layers need to be identified.

One approach to using intermediate representations in KD is described by Y. Wu, P. Passban, M. Rezagholizadeh, Q. Liu, 2020. "Why Skip If You Can Combine: A Simple Knowledge Distillation Technique for Intermediate Layers", https://arxiv.org/abs/2010.03034 (hereinafter "Wu"). This approach uses all of the intermediate representations of the intermediate layers of the teacher, which may solve the skip problem in some cases but does not solve the search problem, because the KD is performed by mapping a combination of an arbitrary subset of intermediate representations of the teacher to a given intermediate layer of the student. For example, intermediate layers 1, 2, and 5 of the teacher may be mapped to intermediate layer 2 of the student for the purpose of contributing (i.e. distilling) knowledge to the student, but this mapping is arbitrary.

Another approach is described by P. Passban, Y. Wu, M. Rezagholizadeh, Q. Liu, 2020. "ALP-KD: Attention-Based Layer Projection for Knowledge Distillation", https://arxiv.org/abs/2012.14022 (hereinafter "Passban"). This approach uses the attention weights of all intermediate layers of the teacher, which may solve both the search and skip problems. The attention weights for all the intermediate layers of the teacher are computed to form a weighted representation, which is mapped to an intermediate layer of the student for the purpose of contributing (i.e. distilling) knowledge to the student.

However, the selection of intermediate layer representations described in the Wu and Passban references cited above is not efficient, because the intermediate representations of the teacher need to be properly weighted for distillation into the intermediate layers of the student. The selection of intermediate representations described in Wu and Passban causes two problems. First, mapping higher layers of the teacher (i.e. intermediate layers closer to the output layer of the teacher) to lower layers of the student (i.e. intermediate layers closer to the input layer of the student) may cause the student to attend to the higher layers of the teacher, which might break the information flow to the student. Second, the attention weights for the intermediate layers of the teacher would be much smaller when the teacher is very large (e.g., when the teacher has an architecture similar to GPT-2, the teacher has large number of intermediate layers).

Other approaches attempt to solve the skip and search problems by concatenating the intermediate representations of the teacher (e.g., S. Sun, Z. Gan, Y. Cheng, Y. Fang, S. Wang, and J. Liu. "Contrastive Distillation on Intermediate representations for language model compression", EMNLP 2020) or by using them to generate layer-wise representations (e.g., H. Fu, S. Zhou, Q. Yang, J. Tang, G. Liu, K. Liu, and X. Li. "LRC-BERT: Latent-representation contrastive knowledge distillation for natural language understanding", AAAI 2021). However, using the intermediate representations of all intermediate layers of the teacher when training the student causes an overfitting problem: the student trained using these KD approaches may perform well for the training data, but not for unseen (i.e. new) validation data.

These problems arising in the context of KD using intermediate representations can also be found in the context of data augmentation for KD. Data augmentation is an important domain to improve the performance of KD with better generalization capability. A min-max data augmentation approach can be used for KD, wherein the intermediate representations of the teacher and the student are used to maximize the margin (i.e. the distance from a given data point to a decision boundary) of the teacher and student to generate additional training data efficiently (i.e., to augment a dataset of training data). In existing approaches to min-max data augmentation, intermediate layers are not considered for data augmentation. Instead, in existing approaches (e.g., as described in U.S. Provisional Patent Application No. 63/076,374 filed Sep. 9, 2020 entitled "MATE-KD: Masked Adversarial Text, a companion to Knowledge Distillation", 2020), the training data is augmented by maximizing the output margin between the teacher and the student (i.e. the difference between the teacher inference data 24 and student inference data 34) using a Kullback-Leibler (KL) divergence loss applied to the logit representation outputs of the teacher and student (also referred to as a knowledge distillation loss).

Therefore, there exists a need for knowledge distillation techniques that enable the use of intermediate representations of the teacher to train the student while overcoming one or more of the limitations of existing approaches described above. There also exists a need for data augmentation techniques for knowledge distillation that overcome one or more of the limitations of existing approaches described above.

SUMMARY

The present disclosure provides methods, devices, and processor readable media for knowledge distillation using intermediate representations. In some examples, a method for training a student using KD is provided in which intermediate layer selection may be performed efficiently to address the skip, search, and overfitting problems of known KD techniques. In some examples, a min-max data augmentation method may be provided for KD based on the intermediate layer selection of the method for training a student using KD of the present disclosure.

In described embodiments, intermediate layers of a teacher (referred to herein "teacher intermediate layers") may be selected using a technique referred to herein as "Dropout-KD". In Dropout-KD, teacher intermediate layers are selected randomly at each training epoch, and the number of teacher intermediate layers selected for a given training epoch is equal to or lower than the number of intermediate layers of the student. The teacher layers and student layers are ordered based on proximity to an input layer of the teacher (referred to herein as "teacher input layer") and an input layer of the student (referred to herein as "student input layer"), respectively, such that the comparison of the intermediate representations of the teacher intermediate layers (referred to herein as "teacher intermediate representations") to the intermediate representations of the student intermediate layers (referred to herein as "student intermediate representations") is performed efficiently without breaking the information flow, i.e. the order of the transformations applied to information as it is propagated through the layers of the teacher from the teacher input layer to the teacher output layer. Over the course of multiple training epochs, all of the teacher intermediate layers will at some point be used for knowledge distillation (i.e. to contribute or distill knowledge to the student during training of the student), which may address the skip, search and overfitting problems described above. In addition, the distillation of knowledge from the teacher intermediate layers of a large teacher (e.g., very large NLP model such as GPT-2) may be efficient because the distillation of knowledge from the teacher is performed using a small number of teacher intermediate layers (i.e. a number equal to or lower than the number of the student intermediate layers).

In some embodiments, Dropout-KD may be applied to train a generator to perform min-max data augmentation, whereby the generator is first trained to generated data samples that maximize an intermediate representation loss (or a weighted loss based on the intermediate representation loss) between the teacher and the student using Dropout-KD layer selection, each generated sample being generated based on a labeled training data sample selected from a training dataset. The student is then trained using the generated (i.e. augmented) data samples, as well as the training dataset, using the KD training method described above.

As used herein, the term "optimize" refers to adjusting an element to be closer to a desired state, and "optimized" describes an element that has been so adjusted. The desired state may be the result of an estimate that may or may not be fully accurate or correct, or may only be correct locally: thus, an "optimal" value for a variable may refer to either a global optimum or a local optimum, and may also refer to an estimated optimum value, or a value that is closer to an optimum than a previous value. Similarly, "minimize" and "maximize" as used herein may refer to optimizing an element wherein the optimum is a local, global, or estimated minimum or maximum, respectively.

As used herein, "student", "student model", and "student network" are used interchangeably to refer to a student model that may be trained using KD, and "teacher", "teacher model", and "teacher network" are used interchangeably to refer to a teacher model that may be used to train the student model using KD.

As used herein, "neural network" refers to an executable computational structure, such as processor-executable software instructions, that can be executed in a training mode (i.e. during training) to learn a model to perform a particular inference task. Once the neural network has been trained, it can be operated in an inference mode (i.e. at inference) to perform the particular inference task. The neural networks described herein shall be described as transformer-based models configured to perform a particular inference task relating to input data, such as sequences of text tokens representative of written language. Examples of inference tasks include binary classification tasks such as sentiment analysis, or generation tasks such as machine language translation of text (e.g. sentences) or generation of text (e.g. sentences) for conversational bots. However, it will be appreciated that various embodiments described herein may be equally applicable to other inference tasks, other neural networks (such as recurrent, fully connected, or convolutional neural networks), with appropriate changes to certain operations such as the specific loss functions used for knowledge distillation.

As used herein, "intermediate layer" refers to a layer, block, or other module of a neural network model that processes information as part of an internal or intermediate process of the neural network model, such that the intermediate layer is situated, in an information flow through the neural network model, between an input layer and an output layer of the neural network model. An "intermediate representation" is information generated by or residing within an intermediate layer and may include the output generated by the intermediate layer (e.g. an activation map intended to be processed by an output layer or one or more other intermediate layers), attention weights of an intermediate layer, or a mapping function (e.g., a classifier) of an intermediate layer.

In some aspects, the present disclosure provides a method for using knowledge distillation to train a student model, comprising a first number of student intermediate layers, to perform an inference task. A first subset of intermediate layers of a teacher model pre-trained to perform the inference task are selected. The number of teacher intermediate layers in the first subset is a second number that is equal to or smaller than the first number. A plurality of training epochs are performed, using a training dataset. Performing each training epoch comprises: forward propagating through the teacher model each labeled data sample of a training batch obtained from the training dataset, the training batch comprising a plurality of labeled data samples; forward propagating each training data sample of the training batch through the student model; for each training data sample in the training batch: obtaining, from each teacher intermediate layer of the first subset, a teacher intermediate representation generated by the respective teacher intermediate layer based on the training data sample, and obtaining, from each student intermediate layer, a student intermediate representation generated by the respective student intermediate layer based on the training data sample; processing the teacher intermediate representations and the student intermediate representations for the training batch to compute an intermediate representation loss; and processing the intermediate representation loss to adjust a plurality of learnable parameters of the student model; selecting a second subset of intermediate layers of the teacher model (the number of intermediate layers in the second subset being the second number); and performing a second training epoch, using the training dataset, by repeating the steps of the first training epoch using the second subset of intermediate layers of the teacher model.

In some aspects, the present disclosure provides a device, comprising: a processor, and a memory having stored thereon instructions which, when executed by the processor, cause the device to use knowledge distillation to train a student model, comprising a first number of student intermediate layers, to perform an inference task. A first subset of intermediate layers of a teacher model pre-trained to perform the inference task are selected. The number of teacher intermediate layers in the first subset is a second number that is equal to or smaller than the first number. A plurality of training epochs are performed, using a training dataset. Performing each training epoch comprises: forward propagating through the teacher model each labeled data sample of a training batch obtained from the training dataset, the training batch comprising a plurality of labeled data samples; forward propagating each training data sample of the training batch through the student model; for each training data sample in the training batch: obtaining, from each teacher intermediate layer of the first subset, a teacher intermediate representation generated by the respective teacher intermediate layer based on the training data sample, and obtaining, from each student intermediate layer, a student intermediate representation generated by the respective student intermediate layer based on the training data sample; processing the teacher intermediate representations and the student intermediate representations for the training batch to compute an intermediate representation loss; and processing the intermediate representation loss to adjust a plurality of learnable parameters of the student model; selecting a second subset of intermediate layers of the teacher model (the number of intermediate layers in the second subset being the second number); and performing a second training epoch, using the training dataset, by repeating the steps of the first training epoch using the second subset of intermediate layers of the teacher model.

In some examples, processing the intermediate representation loss to adjust values of a plurality of learnable parameters of the student model comprises: processing student prediction information and teacher prediction information to compute a knowledge distillation loss, processing the student prediction information and ground truth labels for each labeled training data sample in the training batch to compute a ground truth loss, processing the knowledge distillation loss, ground truth loss, and intermediate representation loss to compute a weighted loss, and back propagating the weighted loss through the student model to adjust values of the plurality of learnable parameters.

In some examples, each teacher intermediate representation and each student intermediate representation comprises the output of its respective intermediate layer.

In some examples, the intermediate representation loss is a contrastive representation distillation loss.

In some examples, processing the teacher intermediate representations and the student intermediate representations for the training batch comprises: processing the teacher intermediate representations to generate a concatenated teacher representation, processing the student intermediate representations to generate a concatenated student representation, and processing the concatenated teacher representation and the concatenated student representation to compute the intermediate representation loss.

In some examples, processing the teacher intermediate representations to generate a concatenated teacher representation comprises: for each teacher intermediate representation, applying a pooling function to the teacher intermediate representation to generate a teacher layer vector, and concatenating the second number of layer vectors corresponding to the second number of teacher intermediate layers to generate the concatenated teacher representation such that the layer vectors are arranged in an order corresponding to an order of the teacher intermediate layers based on proximity to an input layer of the teacher model. Processing the student intermediate representations to generate a concatenated student representation comprises: for each student intermediate representation, applying a pooling function to the student intermediate representation to generate a student layer vector, and concatenating the first number of layer vectors corresponding to the first number of student intermediate layers to generate the concatenated student representation such that the layer vectors are arranged in an order corresponding to an order of the student intermediate layers based on proximity to an input layer of the student model.

In some examples, processing the concatenated teacher representation and the concatenated student representation to compute an intermediate representation loss comprises: mapping the concatenated teacher representation and the concatenated student representation to a common lower-dimensional space using a linear transformation to generate a teacher linear mapping and a student linear mapping, and processing the teacher linear mapping and the student linear mapping to compute the intermediate representation loss.

In some examples, the first number denoting the number of student intermediate layers is equal to the second number denoting the number of teacher intermediate layers, the teacher intermediate layers of the first subset are ordered based on their proximity to a teacher input layer, and the student intermediate layers are ordered based on their proximity to a student input layer, such that each teacher intermediate layer of the first subset corresponds to a respective student intermediate layer having a corresponding position in order. Processing the teacher intermediate representations and the student intermediate representations for the training batch to compute the intermediate representation loss comprises: for each teacher intermediate representation, applying a pooling function to the teacher intermediate representation to generate a teacher layer vector, for each student intermediate representation, applying a pooling function to the student intermediate representation to generate a student layer vector, and processing each teacher layer vector and its corresponding student layer vector to compute the intermediate representation loss.

In some examples, processing each teacher layer vector and its corresponding student layer vector to compute the intermediate representation loss comprises: for each teacher layer vector and its corresponding student layer vector, mapping the teacher layer vector and the student layer vector to a common lower-dimensional space using a linear transformation to generate a teacher vector linear mapping and a student vector linear mapping, and processing each teacher vector linear mapping and its corresponding student vector linear mapping to compute the intermediate representation loss.

In some examples, the method further comprises training a generator model to augment the training dataset by generating additional training data samples. The training comprises: propagating forward through the generator model a generator training batch of the training dataset, comprising one or more training data samples, to generate an augmented data batch comprising one or more augmented data samples, propagating the augmented data batch forward through the teacher model and the student model to generate the intermediate representation loss, and adjusting a plurality of learnable parameters of the generator model such that the generator model is trained to generate augmented data samples that result in high intermediate representation loss when processed by the teacher model and student model. The method further comprises generating one or more augmented data samples using the trained generator model. The first training batch or second training batch comprises the one or more augmented data samples.

In some aspects, the present disclosure provides a non-transitory processor-readable medium containing instructions which, when executed by a processor of a device, cause the device to use knowledge distillation to train a student model, comprising a first number of student intermediate layers, to perform an inference task. A first subset of intermediate layers of a teacher model pre-trained to perform the inference task are selected. The number of teacher intermediate layers in the first subset is a second number that is equal to or smaller than the first number. A plurality of training epochs are performed, using a training dataset. Performing each training epoch comprises: forward propagating through the teacher model each labeled data sample of a training batch obtained from the training dataset, the training batch comprising a plurality of labeled data samples; forward propagating each training data sample of the training batch through the student model; for each training data sample in the training batch: obtaining, from each teacher intermediate layer of the first subset, a teacher intermediate representation generated by the respective teacher intermediate layer based on the training data sample, and obtaining, from each student intermediate layer, a student intermediate representation generated by the respective student intermediate layer based on the training data sample; processing the teacher intermediate representations and the student intermediate representations for the training batch to compute an intermediate representation loss; and processing the intermediate representation loss to adjust a plurality of learnable parameters of the student model; selecting a second subset of intermediate layers of the teacher model (the number of intermediate layers in the second subset being the second number); and performing a second training epoch, using the training dataset, by repeating the steps of the first training epoch using the second subset of intermediate layers of the teacher model.

In some aspects, the present disclosure provides a non-transitory processor-readable medium containing instructions which, when executed by a processor of a device, cause the device to perform the steps of one or more of the methods described above.

BRIEF DESCRIPTION OF THE DRAWINGS

Embodiments will now be described by way of examples with reference to the accompanying drawings, in which like reference numerals may be used to indicate similar features.

DESCRIPTION OF EXAMPLE EMBODIMENTS

Figure 1:
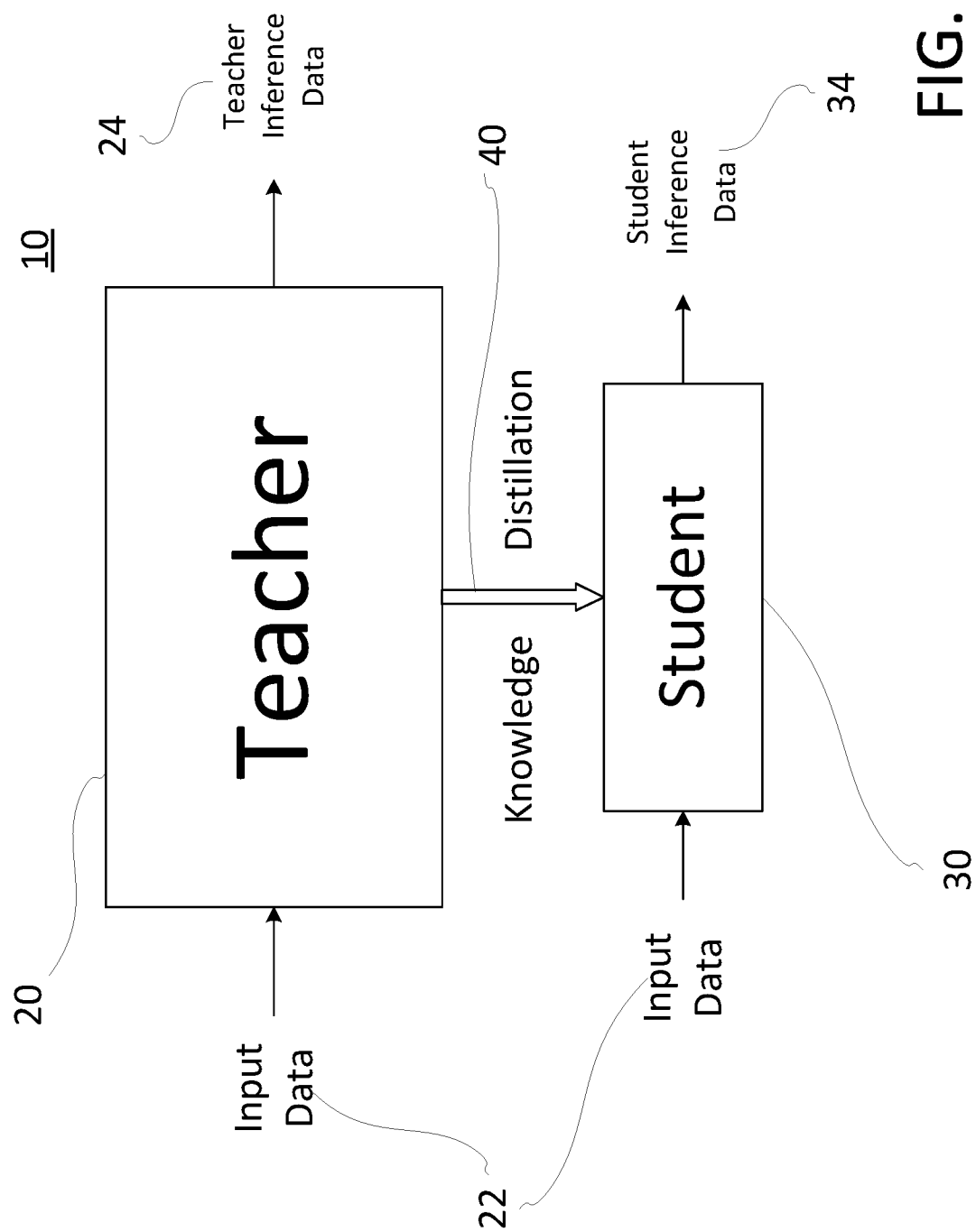
FIG. 1 is a block diagram showing conventional knowledge distillation between a teacher network and a student sub-network.

Conventional KD is widely used because it can achieve good accuracy, is architecture agnostic as to the structure of the teacher and student (e.g., various types of neural network models), and only requires access to the outputs of the teacher. It can be applied to a wide range of inferences tasks, including any classification task, such as image recognition in CV, sentiment analysis in NLP, natural language inference in NLP, etc. It can also be applied to regression tasks. A conventional KD configuration, such as configuration 10 shown in FIG. 1, may compute a training loss based on the teacher inference data 24, the student inference data 34, and the labels of the training data. The training loss is used as an objective function to adjust the learned parameters of the student, for example by back-propagation. The training loss may be computed as a weighted sum of the ground truth loss and KD loss. For example, assuming that the ground truth loss is computed as a cross-entropy (CE) loss (as opposed to another loss type usable in described embodiments, such as mean-square error loss, quadratic loss, etc.), a typical training loss used for KD could be computed as follows:

$$L=(1-\alpha)\cdot L_{CE}(y,S_\theta(x))+\alpha\cdot L_{KD}(T(x),S_\theta(x))$$

wherein L is the training loss used to adjust the learned parameters of the student, α is a distillation weight hyperparameter), $L_{CE}$ is the cross-entropy loss, $L_{KD}$ is the knowledge distillation loss, y is the ground truth label associated with a labeled training data sample x, $S_\theta(x)$ is the inference data of the student with learned parameter values θ based on processing the input data of the labeled training data sample x, T(x) is the inference data of the teacher based on processing the input data of the labeled training data sample x.

$L_{CE}$ is therefore a function that is used to compute a Cross-Entropy (CE) loss between the ground-truth label of the labeled training data sample and the output of the student, $S_\theta(x)$, and $L_{KD}$ is a function that is used to compute a KD loss based on the Kullback-Leibler (KL) divergence between the teacher inference data 24 (i.e. teacher prediction) and the student inference data 34 (i.e. student prediction). $L_{KD}$ may be defined such that the comparison between teacher inference data 24 and student inference data 34 is congruent: for example, the teacher inference data 24 and student inference data 34 used by $L_{KD}$ may be the respective predicted logits output by the teacher and student, respectively (i.e. pre-normalized inference data), whereas the student inference data 34 used by $L_{CE}$ may be the normalized inference data, such as a probability distribution over a plurality of classes for a classification task, or the predicted label output by the student (referred to herein as student's label) for a labeled training data sample x, such that the predicted probability distribution of the output of the student (referred to herein as "student's predicted probability distribution") or student predicted label can be compared to the ground truth label of the labeled training data sample x. Because the student's predicted probability distribution can be derived from the predicted logits output by the student (referred to herein as "student's predicted logits" (by normalizing using a softmax function), and the student's predicted label may be derived from the student's predicted probability distribution (by applying an argmax function), various types of comparison operations using different student outputs can be performed by properly defining $L_{KD}$ and $L_{CE}$.

In a convention KD technique, the values of the learnable parameters θ of the student $S_\theta(\cdot)$ are updated by a gradient descent step to minimize the weighted sum of the two losses, i.e. training loss L. The gradient descent step may be part of back-propagation, wherein a partial derivative of the training loss with respect to each learnable parameter of the student is computed, and the values of learnable parameters are each adjusted in a direction (i.e. up or down) intended to reduce the training loss. Thus, the learnable parameters of the student move towards a gradient direction (i.e. gradient descent) which minimizes the training loss. The gradient descent operation can be represented as:

$$\theta_t=\theta_{t-1}-lr\cdot\nabla_{\theta_{t-1}}L$$

in which $\theta_t$ is the adjusted values of the learnable parameters, $\theta_{t-1}$ is the initial values of the learnable parameters, lr is a learning rate hyperparameter, and $\nabla_{\theta_{t-1}}L$ is the gradient of the training loss with respect to the learnable parameters.

As described above, existing KD approaches using intermediate layer representations (referred to herein as simply "intermediate representations") of the teacher and student tend to exhibit one or more problems. The first is the skip problem, wherein multiple intermediate layers from the teacher are ignored when selecting a subset of intermediate layers from the teacher to distill knowledge to the student during training of the student. The second is the search problem, wherein the subset of teacher layers selected may be arbitrary or non-optimal, as opposed to selecting a subset of layers whose intermediate representations can provide better information for distillation to the student during training of the student. The third is the overfitting problem, wherein using the intermediate representations of all the intermediate layers of the teacher for knowledge distillation (to distill knowledge to the student during training) may result in overfitting, particularly when using a relatively small training dataset, such that the performance of the trained student is high with respect to the training data but low with respect to other data (i.e., the student's behavior at inference does not generalize well to other data outside of the training dataset).

Examples described herein may use intermediate representations in a way that can solve all three of the problems described above, while potentially improving the performance of the trained student at inference, providing better generalization capability, and/or training the student efficiently. Some examples also use intermediate layer representations in a min-max data augmentation approach to improve the generalization and performance of the trained student by augmenting the training dataset used to train the student with additional generated training data samples configured to improve the performance and generalization of the trained student relative to conventional approaches using only the predicted logits output by the student to augment the training dataset.

The Dropout-KD approach used in the example methods herein involves using intermediates representations generated by intermediate layers of the teacher that addresses one or more of the problems and/or provides one or more of the advantages identified above. At each training epoch, intermediate layers of the teacher are selected randomly (i.e., non-selected teacher intermediate layers "drop out" of the training process and are ignored during the current training epoch). The number of intermediate layers selected from the teacher is less than or equal to the total number of intermediate layers of the student. Because teacher intermediate layer selection is performed randomly for a given training epoch, all of the teacher's intermediate layers are considered over time throughout the whole training period (consisting of multiple training epochs), which may solve the skip, search and overfitting problems described above. The general Dropout-KD approach to KD, as described herein with reference to example embodiments, can be used to train deep neural networks (DNNs) to perform inference tasks in any application, such as CV, NLP, etc. Example embodiments may be described herein with reference to distilling knowledge from a large Bidirectional Encoder Representations from Transformers (BERT)-based teacher to a smaller student to train the student (which may also be a BERT-based transformer-based neural network model, such as a distilled or compressed smaller version of BERT) to perform an NLP inference task. Prior to performing KD as described herein, the teacher may be pre-trained (which means the teacher is trained with a training data set with a large number of data samples where the input data in each data sample is text data) and then fine-tuned on a task-specific dataset.

Example embodiments will now be described with respect to methods, devices, and non-transitory media for knowledge distillation using intermediate layers.

Figure 2:
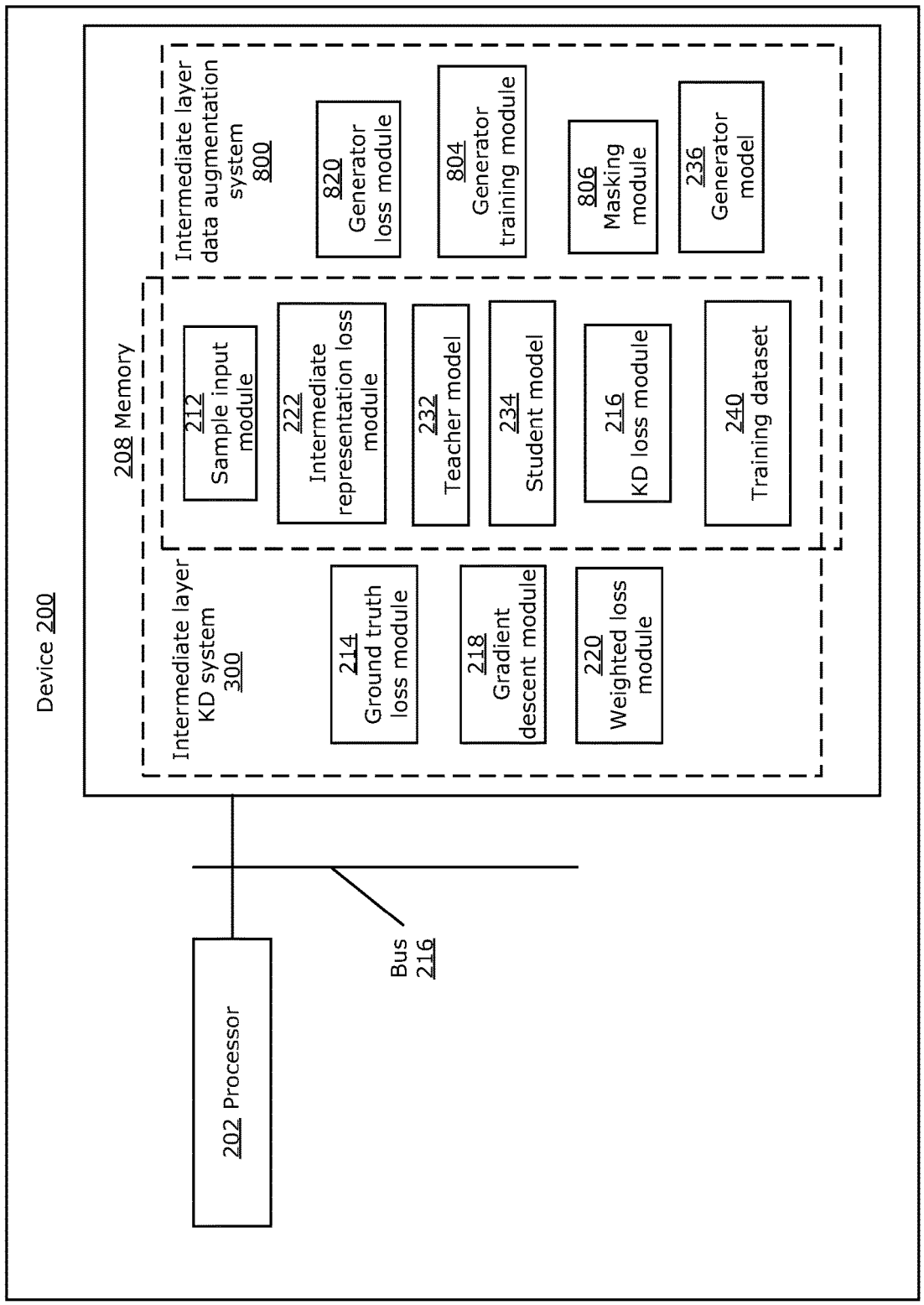
FIG. 2 is a block diagram showing a device for knowledge distillation using intermediate layers, according to example embodiments described herein.

FIG. 2 shows a device 200 that may be used to perform the various KD methods described herein. Although an example embodiment of the device 200 is shown and discussed below, other embodiments may be used to implement examples disclosed herein, which may include components different from those shown. Although FIG. 2 shows a single instance of each component of the device 200, there may be multiple instances of each component shown.

The device 200 includes one or more processors, such as a central processing unit (CPU) and accelerator, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors may collectively be referred to as a "processor device" or simply a processor 202.

The device 200 includes one or more memories, collectively referred to as memory 208, which may include a volatile or non-volatile memory (e.g., a flash memory, a random access memory (RAM), and/or a read-only memory (ROM)). The non-transitory memory 208 may store machine-executable instructions for execution by the processor 202, such as to carry out examples described in the present disclosure. Machine-executable instructions are stored in the memory 208, which may be executed by the processor 202 to perform the methods described herein. The operation of the device 200 in executing the instructions to perform the methods described herein is described below with reference to FIGS. 3-9. The machine-executable instructions include instructions of an intermediate layer KD system 300 and instructions of an intermediate layer data augmentation system 800 that are executable by the processor 202 to perform the functions of various functional modules used to perform knowledge distillation and data augmentation according to the methods described herein. These modules include a sample input module 212, a ground truth loss module 214, a KD loss module 216, a gradient descent module 218, a weighted loss module 220, an intermediate representation loss module 222, a generator module 820, a generator training module 804, and a masking module 806. The memory 208 may include other machine-executable instructions, such as for implementing an operating system and other applications or functions.

The memory 208 may also store data used for performing the KD methods described herein, such as a training dataset 240 consisting of multiple data samples where each data sample is annotated with semantic information such as a label. In some embodiments, augmented data generated by the intermediate layer data augmentation system 800 may also be stored in the memory 208, for example, the augmented data may be stored as part of the training dataset 240 after being generated.

The memory 208 may also store the student model 234 and teacher model 232, each of which may include values for a plurality of learnable parameters (referred to herein as "learnable parameter values"), as well as values for a plurality of hyperparameters (referred to herein as "hyperparameter values") used to control the structure and operation of the student model 234 and teacher model 232. Hyperparameter values are usually set prior to training and are not adjusted during training, in contrast to learnable parameter values, which are adjusted as part of the training process. The student model 234 and teacher model 232 each comprises an input layer, an output layer, and a plurality of intermediate layers situated between the input layer and output layer. The learnable parameters of each model 232, 234 are typically situated within the various layers: for example, each layer may consist of one or more neurons of a neural network, and the learnable parameters may be weights of the connections between neurons as well as biases applied to the weighted inputs to a neuron. The intermediate representation of an intermediate layer, as described above, may be the output of the intermediate layer (e.g. the activation values of each neuron of the intermediate layer), the attention weights of the intermediate layer (e.g. the weights of each connection to a neuron of the intermediate layer), a mapping function of the intermediate layer, or some other information associated with the intermediate layer.

In some embodiments, the memory 208 may also store a generator model 236 for performing data augmentation using the intermediate layer data augmentation system 800 according to the method 900 of FIG. 9 described below. The generator model 236 may be any suitable machine learning model, such as a deep neural network model, which may be trained to generate labeled training data samples according to the examples described herein.

In some examples, the device 200 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the device 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The components of the device 200 may communicate with each other via various means, such as a data bus 216. In some embodiments, the operations of the device 200 may be performed by a distributed computing system, one or more servers in one or datacenters or one or more virtual machines instantiated by one or more servers of a cloud computing platform, and such a distributed computing system is understood to fall within the meaning of "device". Alternatively, the methods described herein may be implemented in a service provided by a cloud computing platform, for example implement in software-as-a-service, machine-learning-as-a-service, or a platform-as-a-service provided by a cloud service provider using a cloud computing platform.

Figure 3:
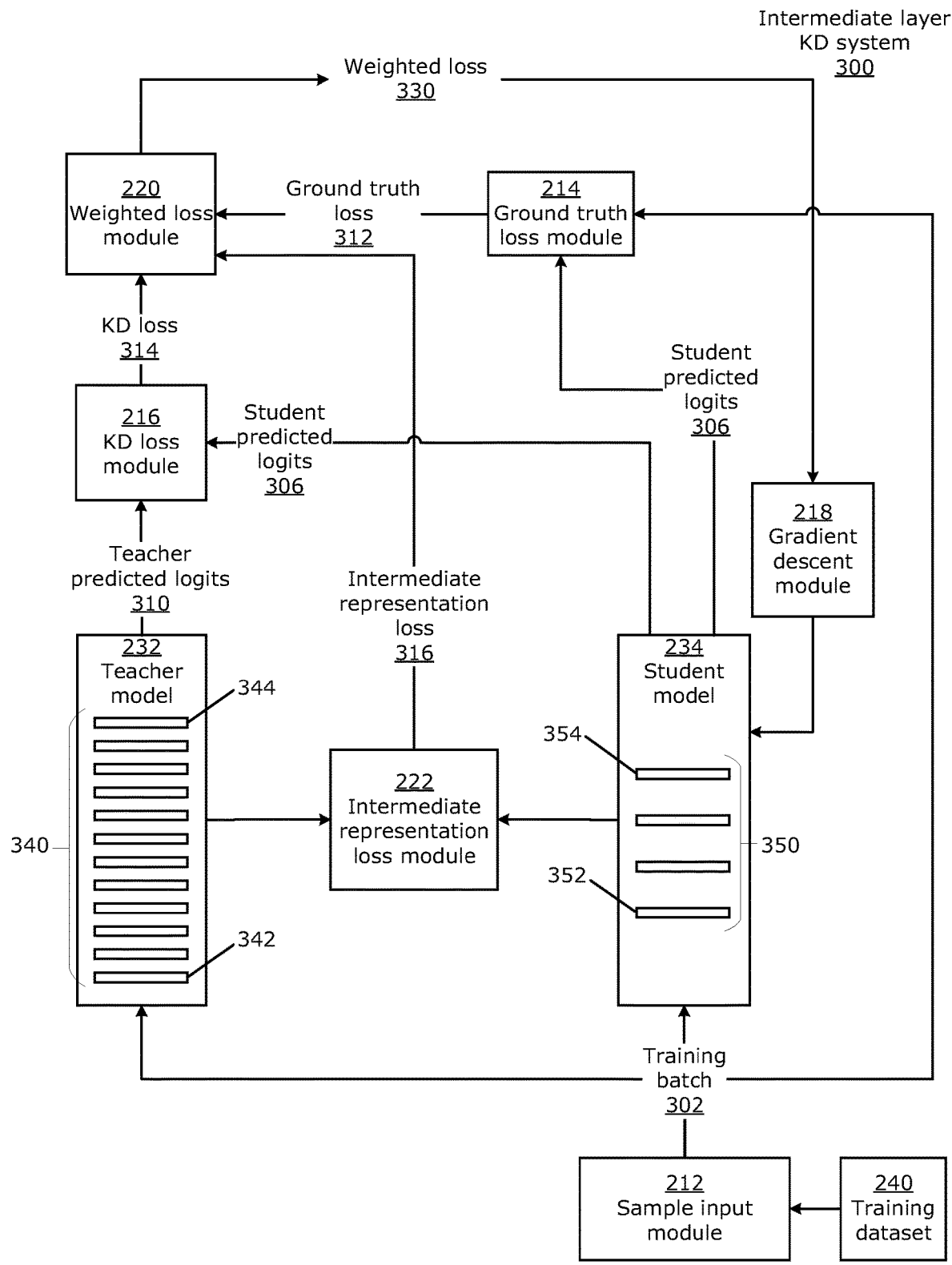
FIG. 3 is a block diagram showing an intermediate layer knowledge distillation system, according to example embodiments described herein.

FIG. 3 shows the functional blocks and data flows of an intermediate layer knowledge distillation system 300, including the sample input module 212, ground truth loss module 214, KD loss module 216, gradient descent module 218, the weighted loss module 220, and the intermediate representation loss module 222 of the device 200 of FIG. 2. The operations of the intermediate layer knowledge distillation system 300 will be described with reference to an example knowledge distillation method 500 with reference to FIG. 5 below.

Figure 5:
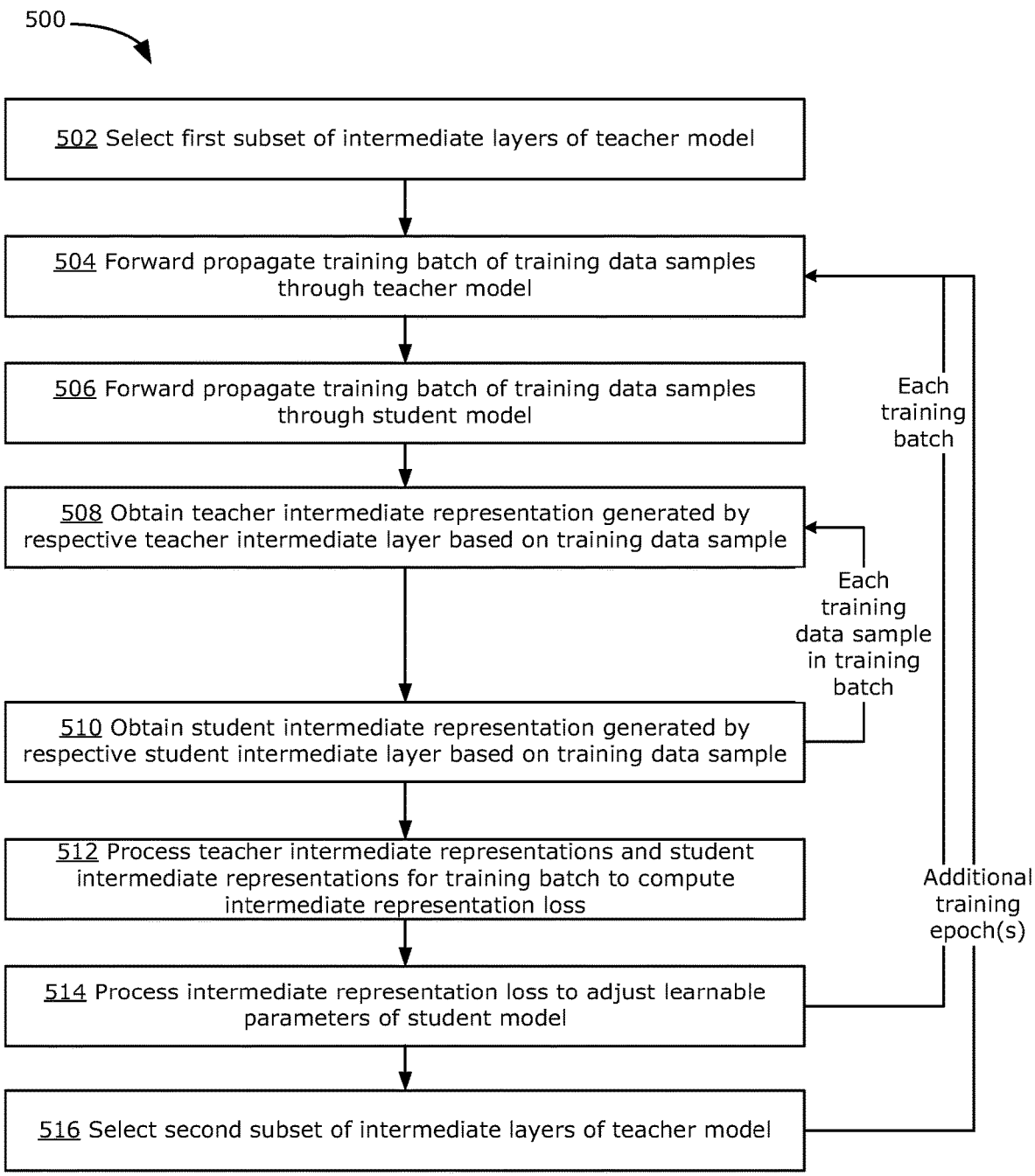
FIG. 5 is a flowchart showing steps of an example method for performing knowledge distillation using intermediate layers, according to example embodiments described herein.

FIG. 5 is a flowchart showing steps of an example method 500 for performing KD using intermediate representations of intermediate layers of the teacher model, as performed by a knowledge distillation system such as the intermediate layer knowledge distillation system 300 of FIG. 3. It will be appreciated that the functional modules, inputs, and outputs of the intermediate layer knowledge distillation system 300 are used as examples of how to perform the operations of the method 500; in some embodiments, one or more of the various functional modules 212, 214, 216, 218, 220, 222 may be changed, omitted, split into two or more functional modules, and/or combined with one or more of the other functional modules.

In the described examples, a ground truth (GT) loss 312 is used as part of the intermediate layer knowledge distillation system 300. The GT loss 312 may be referred to in this disclosure, and in particular in the example equations used herein, as a cross-entropy (CE) loss $L_{CE}$ used in the context of a classification task. It will be appreciated that other loss types, such as mean square error (MSE) loss, may be used in the context of other inference task types such as regression tasks.

In the example of FIG. 3, the teacher model 232 is a relatively large neural network model (i.e. a neural network model including a large number of learnable parameters) which as been trained to perform an inference task, and which is to be compressed using KD. The student model 234 is a relatively smaller neural network model (i.e. a neural network model including a smaller plurality of learnable parameters than the teacher model 233) which, once trained to perform the inference task using KD, is to be installed on (i.e. deployed to) a computing device with limited computing resources in order to perform the inference task on new data samples. The student model 234 includes a first number m of student intermediate layers 350, ordered (from closest to the input layer to closest to the output layer) from a first student intermediate layer 352 to a final student intermediate layer 354. The teacher model 232 includes a number n of teacher intermediate layers 340, ordered (from closest to the input layer to closest to the output layer) from a first teacher intermediate layer 342 to a final teacher intermediate layer 344. In some examples, n>>m.

Method 500 begins with operation 502. At 502, a first subset of the teacher intermediate layers 340 of the teacher model 232 are selected by the intermediate representation loss module 222. The intermediate representation loss module 222 may be implemented differently in different embodiments: a first example embodiment of the intermediate representation loss module 222 as a layer concatenating intermediate representation loss module 222a is described below with reference to FIGS. 4A and 7A, and a second example embodiment of the intermediate representation loss module 222 as a layer-wise intermediate representation loss module 222b is described below with reference to FIGS. 4B and 7B. For the purpose of describing the intermediate layer knowledge distillation system 300 of FIG. 3 and the method 500 of FIG. 5, however, reference will be made to simply an unspecified intermediate representation loss module 222.

The first subset of teacher intermediate layers consists of a second number p of teacher intermediate layers, wherein second number p is equal to or smaller than the first number m of student intermediate layers 350. In some examples, such as the examples described with reference to the layer-wise intermediate representation loss module 222b of FIGS. 4B and 7B below, the second number p is equal to first number m, p=m, and the number of teacher intermediate layers in the first subset may therefore be referred to as m instead of p.

The method 500 then performs a first training epoch consisting of operations 504 through 514. At 504, the input data of each labeled training data sample of a batch of labeled training data samples (referred to herein as training batch) obtained from the training dataset 240 is forward propagated through the teacher model 234 to generate, for the input data of each labeled training data sample in the batch of training data, a teacher prediction (i.e. teacher inference data 24 from FIG. 1), shown in FIG. 3 as teacher predicted logits 310. The training batch includes multiple training labeled training data samples. Each labeled training data sample of the dataset includes input data and a ground truth label, which may be semantic information associated with the input data. For example, a training batch 302 may consist of one or more labeled training data samples obtained from the training dataset 240 by the sample input module 212. In some embodiments, the sample input module 212 may obtain the training batch 302 stochastically from the training dataset 240, particularly if the training dataset 240 includes a large number of labeled data samples. For example, the training dataset 240 may include 100,000 labeled training data samples, and a training batch 302 may consist of 100 labeled training data samples obtained stochastically from the training dataset 240 by the sample input module 212.

At 506, the student model 234 processes the training batch 302 (i.e. the input data of each labeled training data sample in the training batch) to generate, for the input data of each labeled training data sample in the training batch 302, a student prediction (i.e. student inference data 34 from FIG. 1), shown in FIG. 3 as student predicted logits 306. In some embodiments, the student inference data 34 generated by processing input data of a given labeled training data sample may include the student predicted logits 306 (i.e. pre-normalized probability distribution of the student's predictions) and/or a student predicted classes (i.e. a normalized predicted probability distribution over multiple class for a classification task, which may be derived from the student predicted logits by applying a softmax function to normalize the predicted logits into a normalized probability distribution). In FIG. 3, the student predicted logits 306 are shown being used as inputs to two functional blocks; it will be appreciated that, as described above, either the student predicted logits 306 or student predicted classes 308 may be used depending on the nature of the loss function receiving the input in different embodiments.

Returning to method 500 shown in FIG. 5, operations 508 and 510 are performed by the intermediate representation loss module 222 for each labeled training data sample x in the training batch 302. At 508, a teacher intermediate representation is obtained from each of the p teacher intermediate layers of the first subset of teacher intermediate layers. Each teacher intermediate representation is generated by its respective teacher intermediate layer based on the teacher intermediate representation received from a previous teacher intermediate layer. If the intermediate layer adjacent to (i.e. connected to) the input layer is included in the first subset, the intermediate representation generated by this intermediate layer is generated based on the input data (or pre-processed input data) of a given labeled training data sample. At 510, a student intermediate representation is obtained from each of the m student intermediate layers. Each student intermediate representation is generated by its respective student intermediate layer based on the student intermediate representation received from a previous student intermediate layer. The intermediate representation generated by the intermediate layer adjacent to (or connected to) the input layer of the student is generated based on the input data (or pre-processed input data) of a given labeled training data sample. As described above, an intermediate representation may be an output of the intermediate layer or another type of information generated by or resident within the intermediate layer.

At 512, the intermediate representation loss module 222 processes the teacher intermediate representations and the student intermediate representations for the training batch 302 to compute an intermediate representation loss 316. Example approaches to computing the intermediate representation loss 316 will be described below with reference to the layer concatenating intermediate representation loss module 222a of FIGS. 4A and 7A and the layer-wise intermediate representation loss module 222b of FIGS. 4B and 7B.

At 514, the intermediate representation loss 316 is processed to adjust a plurality of the values of the learnable parameters of the student model 234. Operation 514 may consist of several sub-operations, which are shown in the flowchart of FIG. 6.

Figure 6:
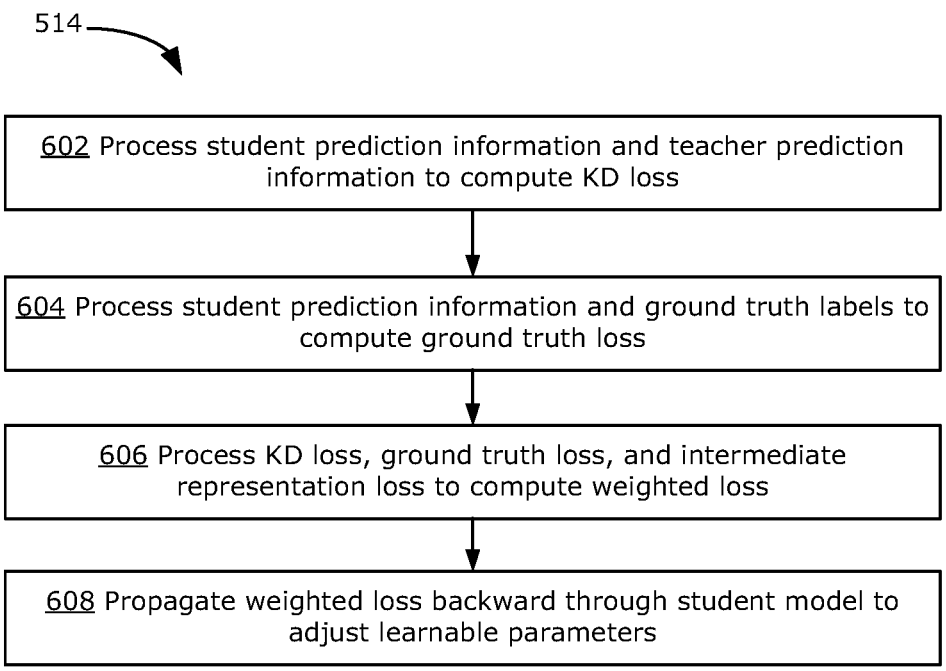
FIG. 6 is a flowchart showing example sub-steps of the learnable parameter adjustment operation of the method of FIG. 5.

FIG. 6 shows example sub-operations of operation 514 of the method 500 of FIG. 5. At 602, the student inference data 34 (i.e. the student predicted logits 306) and teacher inference data 24 (i.e. the teacher predicted logits 310) for each labeled training data sample x in the training batch 302 are processed by a knowledge distillation loss module 216 to compute a knowledge distillation loss 314 for the training batch 302 (denoted herein as X). The KD loss 314 between the student predicted logits 306 and the teacher predicted logits 310 may be defined based on Kullback-Leibler (KL) divergence as:

$$L_{KD} = softmax(T(X)/\tau) \cdot \log\left(\frac{softmax(T(X)/\tau)}{softmax(S_\theta(X)/\tau)}\right)$$

wherein, as described above, $\tau$ is a temperature parameter that controls the concentration level of the distribution, softmax($\cdot$) is the used to compute the predicted probability over classes, $S_\theta(X)$ denotes the student predicted logits 306, and T(X) denotes the teacher predicted logits 310. For a regression task, as described above, $L_{KD}$ may be computed by using a mean-squared-error (MSE) loss function on the teacher predicted logits 310 and student predicted logits 306.

KL divergence is used to measure the difference between the student predicted logits 306 and the teacher predicted logits 310. Minimizing the KL divergence, and therefore the KD loss 314, by adjusting a plurality of the values of the learnable parameters of the student model 234 should result in the student model 234 learning to output student inference data 34 that is close to (i.e. similar to) the teacher inference data 24 output by the teacher model 20.

At 604, a ground truth loss module 214 processes the student inference data 34 (i.e. student predicted logits 306) and the ground truth label y of the labeled training data sample x for each respective labeled training data sample in the training batch 302 to compute a respective ground truth loss 312 for each respective data sample x in the training batch 302, denoted $L_{CE}$ (indicating a cross entropy loss as the ground truth loss 312). The cross entropy loss for training batch 302 (denoted by X in the cross entropy loss below) may be computed as:

$$L_{CE} = -softmax(y/\tau) \cdot \log(softmax(S_\theta(X)/\tau))$$

wherein $\tau$ is a temperature hyperparameter that controls the concentration level (i.e. the degree to which a prediction concentrates the predicted probability on one or a few classes instead of distributing the predicted probability more widely over all of the classes—the higher the temperature, the softer the distribution, i.e., the less confident the model will be about its predictions); softmax($\cdot$) is used to normalize the predicted probability distribution over a set of classes; and $S_\theta(X)$ denotes the student predicted logits 306. In other embodiments, different ground truth loss functions may be used; for example, for a student model being trained to perform a regression task, $L_{CE}$ may be computed by using a mean-squared-error (MSE) loss function.

At 606, the intermediate representation loss 316, ground truth loss 312, and KD loss 314 are processed by the weighted loss module 220 to compute a weighted loss 330. The weighted loss 330 may be computed as:

$$L_S = \lambda_1 L_{CE} + \lambda_2 L_{KD} + \lambda_3 L_{CRD}$$

wherein $L_{CRD}$ denotes the intermediate representation loss 316 (shown as a contrastive representation distillation loss, described in detail below with reference to FIGS. 4A-4B and 7A-7B), and the weights $\lambda_1$, $\lambda_2$, $\lambda_3$ are hyperparameters of the intermediate layer KD system 300 (which may be stored in the memory 208).

At 608, the weighted loss 330 is back propagated through the student model 234 to adjust a plurality of values of the learnable parameters of the student model 234. A plurality of the values of the learnable parameters ($\theta$) of the student model 234 may be adjusted by minimizing the weighted loss 330 function:

$$\min_\theta L_S = \lambda_1 L_{CE} + \lambda_2 L_{KD} + \lambda_3 L_{CRD}$$

according to known machine learning techniques, e.g. using the gradient descent module 218 to perform gradient descent to adjust the learnable parameter values of each layer of the student model 234. The gradient descent operation performed by the gradient descent module 218 is intended to compute or estimate a partial derivative of the weighted loss 330 with respect to the value of each of the learnable parameters of the student model 234, using the chain rule as necessary, to propagate the weighted loss function backward from the output layer, through each previous intermediate layer 354 through 352, to the input layer of the student network 234. The adjusted values of the learnable parameters of the student model 234 may be identified as values of the learnable parameters of the student model 234 that would result in a lower or minimized weighted loss 330 with respect to the training batch 302.

Returning to method 500 shown in FIG. 5, the first training epoch may include repeating operations 504 through 514 with additional training batches. After the first training epoch is complete (e.g., when the entire training dataset 240 has been used to train the student model 234), the method 500 proceeds to operation 516. At 516, the intermediate representation loss module 222 selects a second subset of teacher intermediate layers 340 of the teacher model 232. The number of intermediate layers in the second subset is the second number p, as with the first subset used in the first training epoch. The second subset may be chosen stochastically (i.e. randomly or pseudo-randomly), and may be different from the first subset, such that repeated training epochs result in various recombinations of the teacher intermediate layers being used.

After operation 516, the method 500 returns to operation 504 to perform a second training epoch, wherein operations 504 through 514 are repeated one or more times. The method 500 may also include third and subsequent training epochs, each using a new random subset of teacher intermediate layers.

In some embodiments, additional training epochs may be performed until a training termination condition is reached. The training termination condition may be a predetermined number of training epochs defined by a training hyperparameter, convergence of the student on a configuration of learnable parameter values as indicated by falling below a gradient threshold or satisfying some other convergence threshold, etc.

Examples of the intermediate representation loss module 222 will now be described with reference to the operations of a layer concatenating intermediate representation loss module 222a shown in FIGS. 4A and 7A, and the operations of a layer-wise intermediate representation loss module 222b shown in FIGS. 4B and 7B. The layer concatenating intermediate representation loss module 222a may be used in examples wherein the second number p of selected teacher intermediate layers is not necessarily equal to the first number m of intermediate student layers; in contrast, the layer-wise intermediate representation loss module 222b may only be used in examples in which p is strictly equal to m.

Figure 4A:
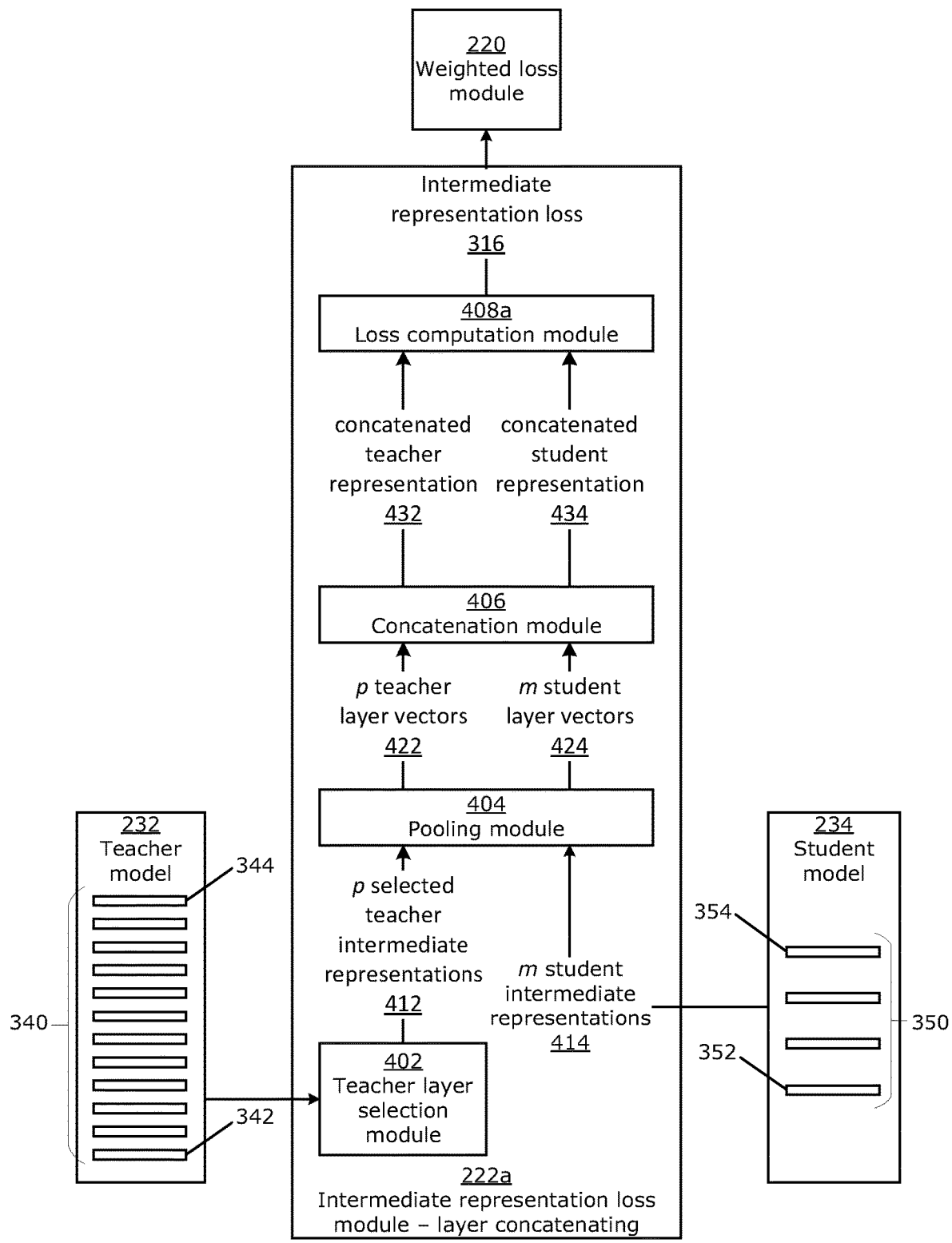
FIG. 4A is a block diagram showing an example embodiment of the intermediate representation loss module of FIG. 3 as a layer concatenating intermediate representation loss module.

FIG. 4A shows an example embodiment of the intermediate representation loss module 222 as a layer concatenating intermediate representation loss module 222a. The layer concatenating intermediate representation loss module 222a includes a teacher layer selection module 402 for selecting the subsets (e.g., first subset and second subset) of teacher intermediate layers 340 at the beginning of each training epoch (i.e., operations 502 and 516 of method 500). The layer concatenating intermediate representation loss module 222a also includes a pooling module 404, a concatenation module 406, and a loss computation module 408a. The operations of the layer concatenating intermediate representation loss module 222a will be described below with reference to the method steps of FIG. 7A.

Figure 7A:
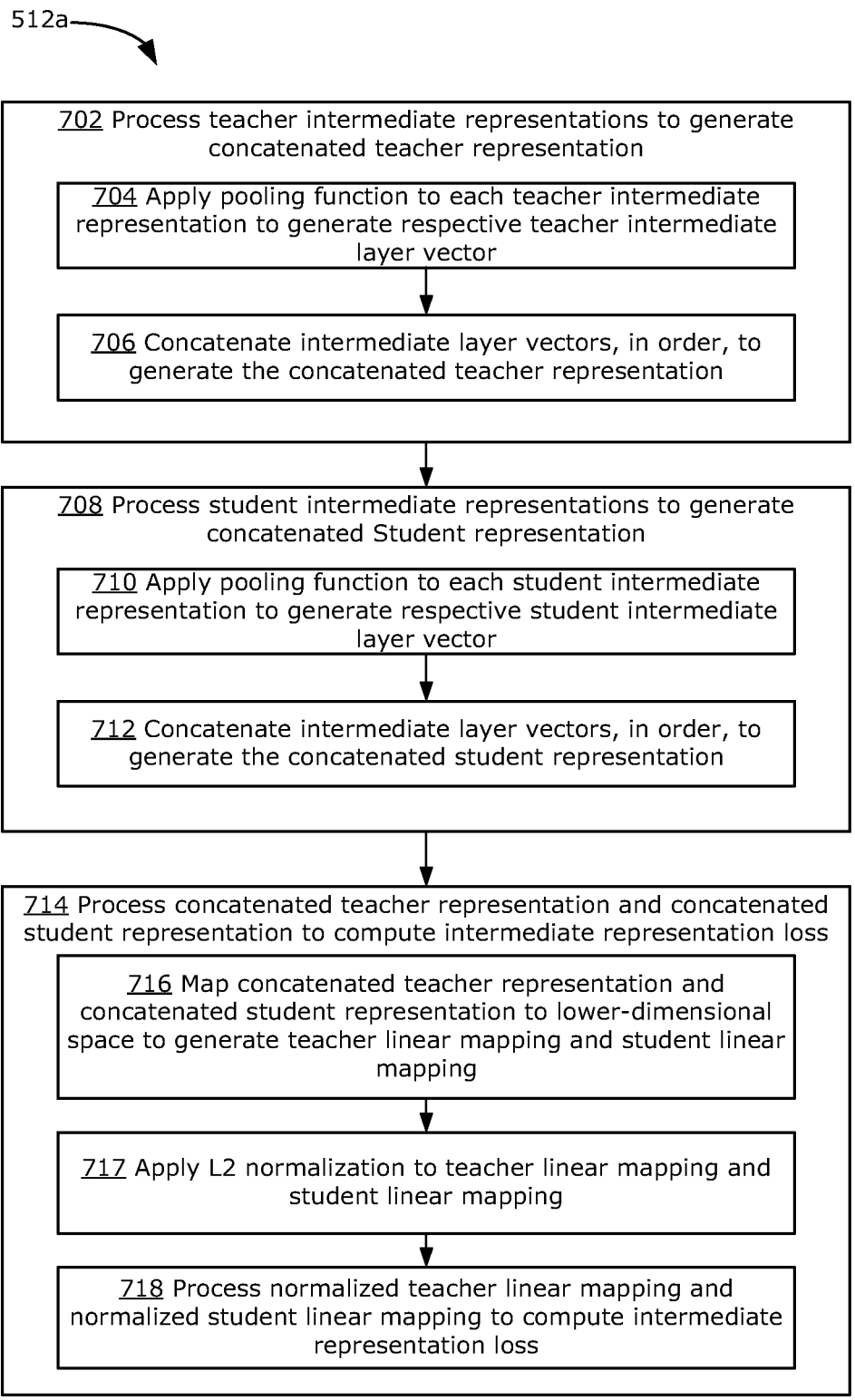
FIG. 7A is a flowchart showing example sub-steps of the intermediate representation loss computation operation of the method of FIG. 5 using the layer concatenating intermediate representation loss module of FIG. 4A.

FIG. 7A shows example sub-operations of the intermediate representation loss computation operation 512 of the method of FIG. 5 in a first example embodiment 512a using the layer concatenating intermediate representation loss module 222a of FIG. 4A.

The layer concatenating intermediate representation loss module 222a operates by concatenating the sets of intermediate representations from each of the teacher and student model 232, 234 and mapping them to a common information space in order to compare them to generate the intermediate representations loss 316. First, the processing of the teacher intermediate representations will be described. During the forward propagation of the input data of each labeled training data sample of the training batch 302 through the teacher model 232 (i.e. operation 504 of method 500), the teacher layer selection module 402 obtains a teacher intermediate representation for each of the p selected teacher intermediate layers for the current training epoch, thereby generating a set of p selected teacher intermediate representations 412 during each forward propagation operation. The teacher layer selection module 402 may store information indicating which of the teacher intermediate layers have been selected for the current training epoch.

In the present example, the inference task which the teacher model 232 has been trained to perform, and which the student model 234 is being trained to perform, is an NLP task based on a sequence of input text tokens. Thus, each labeled training data sample is a sentence denoted as (X,y) wherein the input data $X=(x_0, \ldots, x_{L-1})$ is a sequence of length L and y is the corresponding label for the input data. The teacher intermediate representations and student intermediate representations are word-embedding matrices that can be described as $X=R^{L \times d}$, wherein $x_i \in R^d$ is a d-dimensional vector, i.e. each intermediate representation is a matrix of dimensions L×d. In the present example, the teacher model 232 uses $d_1$ as its d value, whereas the student model 234 uses $d_2$ as its d value: the teacher intermediate representations therefore may not have the same dimensions as the student intermediate representations. The set of p teacher intermediate representations 412 can therefore be denoted as $H^T = H_1^T, \ldots H_p^T)$, wherein $H_i^T \in R^{L \times d_1}$.

At 702, the p teacher intermediate representations 412 are processed to generate a concatenated teacher representation 432. Operation 702 includes sub-operations 704 and 706.

At 704, for each teacher intermediate representation of the p teacher intermediate representations 412, the pooling module 404 applies a pooling function to the teacher intermediate representation to generate a teacher layer vector, thereby generating a set of p teacher layer vectors 422 based on the p teacher intermediate representations 412. The pooling function may be an average pooling (e.g. mean pooling) function, a max pooling function, or another function that derives a single representative scalar value based on a plurality of scalar values (e.g. a vector or a row or column of a matrix). In the present example, a mean pooling function is applied to the set of p teacher intermediate representations 412 to compute the sentence-wise representations of each teacher intermediate representation, thereby generating the set of p teacher layer vectors 422, each which is a row-wise average over $H_i^T$ to get $\bar{h}_i^T \in R^{d_1}$, i.e. each teacher layer vector is a vector of length $d_i$.

At 706, the concatenation module 406 concatenates the set of p teacher layer vectors 422 corresponding to the set of p teacher intermediate layers 412 to generate the concatenated teacher representation 432, denoted as $\bar{h}^T = [\bar{h}_1^T, \ldots, \bar{h}_p^T] \in R^{p \times d_1}$ (i.e. a matrix of dimensions p×$d_1$), such that the p teacher layer vectors 422 are arranged in the matrix in an order corresponding to an order of the teacher intermediate layers 340 based on proximity to an input layer of the teacher model. In other words, the ordering of the entire set of n teacher intermediate layers, from the input layer to the output layer of the teacher model 232, is preserved within the subset of p selected teacher intermediate layers when concatenating the teacher layer vectors derived therefrom. Thus, where $\bar{h}^T = [\bar{h}_1^T, \ldots, \bar{h}_p^T]$, $\bar{h}_1^T$ corresponds to the selected teacher intermediate layer closest to the input layer, whereas $\bar{h}_p^T$ corresponds to the selected teacher intermediate layer closest to the output layer.

Next, the processing of the student intermediate representations will be described. During forward propagation of the input data of each labeled training data sample of the training batch 302 through the student model 234 (i.e. operation 506 of method 500), the m student intermediate representations 414 corresponding to the m student intermediate layers 350 are obtained by the pooling module 404.

At 708, the m student intermediate representations 414 are processed to generate a concatenated student representation 434. Operation 708 includes sub-operations 710 and 712.

At 710, for each student intermediate representation of the m student intermediate representations 414, the pooling module 404 applies a pooling function to the student intermediate representation to generate a student layer vector, thereby generating a set of m student layer vectors 424 based on the m student intermediate representations 414. As described above, the pooling function may be any function that derives a single representative scalar value based on a plurality of scalar values (e.g. a vector or a row or column of a matrix). In the present example, a mean pooling function is applied to the set of m student intermediate representations 414 to compute the sentence-wise representations of each student intermediate representation, thereby generating the set of m student layer vectors 424, each which is a row-wise average over $H_i^S$ to get $\bar{h}_i^S \in R^{d_2}$, i.e. each student layer vector is a vector of length dz.

At 712, the concatenation module 406 concatenates the set of m student layer vectors 424 corresponding to the set of m student intermediate layers 414 to generate the concatenated student representation 434, denoted as $\bar{h}^S = [\bar{h}_1^S, \ldots, \bar{h}_m^S] \in R^{m \times d_2}$, such that the m student layer vectors 424 are arranged in an order corresponding to an order of the student intermediate layers 350 based on proximity to an input layer of the student model. Thus, where $\bar{h}^S = [\bar{h}_1^S, \ldots, \bar{h}_m^S]$, $\bar{h}_1^S$ corresponds to the student intermediate layer closest to the input layer (i.e. first student intermediate layer 352), whereas $\bar{h}_m^S$ corresponds to the student intermediate layer closest to the output layer (i.e. final student intermediate layer 354).

At 714, the loss computation module 408a processes the concatenated teacher representation 432 and the concatenated student representation 434 to compute the intermediate representation loss 316. Operation 714 includes sub-operations 716, 717, and 718.

At 716, the loss computation module 408a maps the concatenated teacher representation 432 (i.e. $\bar{h}^T$) and the concatenated student representation 434 (i.e. $\bar{h}^S$) to a common lower-dimensional space using a linear transformation to generate a teacher linear mapping $f(\bar{h}^T)$ and a student linear mapping $g(\bar{h}^S)$ occupying the common lower-dimensional space $R^u$ such that $f(\bar{h}^T), g(\bar{h}^S) \in R^u$.

At 717, the teacher linear mapping and the student linear mapping are normalized using an L2 normalization function, i.e. the teacher linear mapping and the student linear mapping are normalized with respect to the square root of the sum of the squared vector values.

At 718, the loss computation module 408a processes the normalized teacher linear mapping and the normalized student linear mapping to compute the intermediate representation loss 316. In some examples, the normalization step 717 is considered part of the processing sub-operation 718. In different embodiments, various types of loss function (e.g., contrastive, mean-square-error (MSE), etc.) can be used to compute the intermediate representation loss 316, depending on the nature of the inference task, the nature of the intermediate representations being used, etc. In this example, a contrastive representation distillation (CRD) loss function, denoted $L_{CRD}$, is used to compute the intermediate representation loss 316. $L_{CRD}$ can be computed by concatenating the intermediate representations:

$$L_{CRD} = -\log \frac{\exp(\langle f(\bar{h}_k^T), g(\bar{h}_k^S) \rangle / \tau)}{\sum_{j=0}^{K} \exp(\langle f(\bar{h}_k^T), g(\bar{h}_j^S) \rangle / \tau)}$$

wherein k denotes the current training data sample and j≠k denotes the negative samples in a training batch 302 consisting of K samples. The contrastive objective is to map the student linear mapping $g(\bar{h}_k^S)$ of positive sample k to teacher linear mapping $(\bar{h}_k^T)$, and the negative representations $\{g(\bar{h}_j^S)\}_{j \neq k}^K$ far apart from $f(\bar{h}_k^T)$. The function $\langle .,. \rangle$ is the cosine similarity between two vectors. τ is the temperature parameter that controls the concentration level, as described above.

Figure 4B:
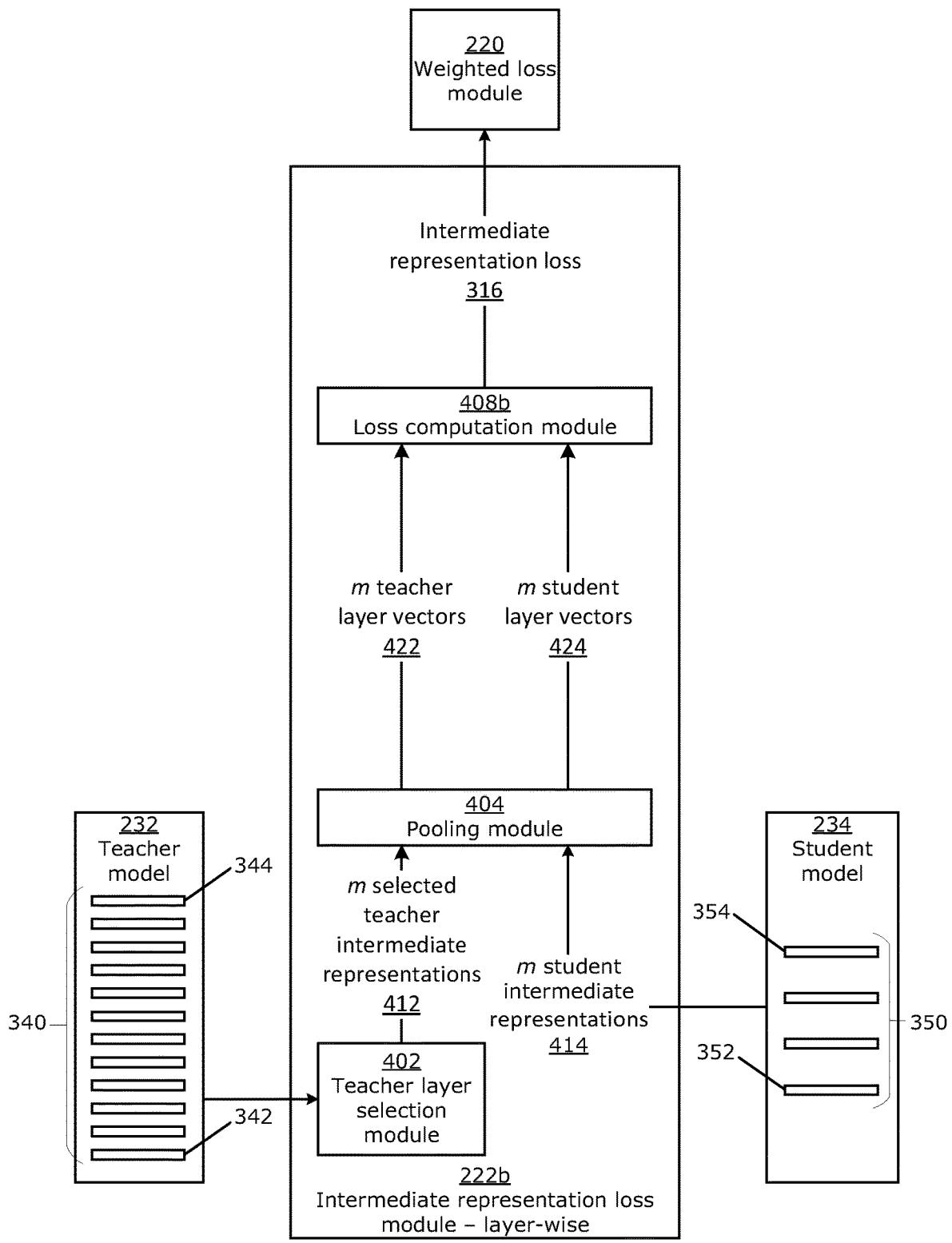
FIG. 4B is a block diagram showing an example embodiment of the intermediate representation loss module of FIG. 3 as a layer-wise intermediate representation loss module.

Referring to FIG. 4B, an example embodiment of the intermediate representation loss module 222 as a layer-wise intermediate representation loss module 222b is shown. The two differences between the layer concatenating intermediate representation loss module 222a and the layer-wise intermediate representation loss module 222b are, first, the omission of the concatenation module 406 from the latter, resulting in a different set of operations for the latter's loss computation module 408b relative to the former's loss computation module 408a; and second, the fact that p=m in all cases, such that the teacher intermediate selection module 402 always obtains a set of m selected teacher intermediate representations 412. Accordingly, only the operations of the loss computation module 408b will be described in detail with reference to FIG. 4A. The operations of the layer-wise intermediate representation loss module 222b will be described below with reference to the method steps of FIG. 7B.

Figure 7B:
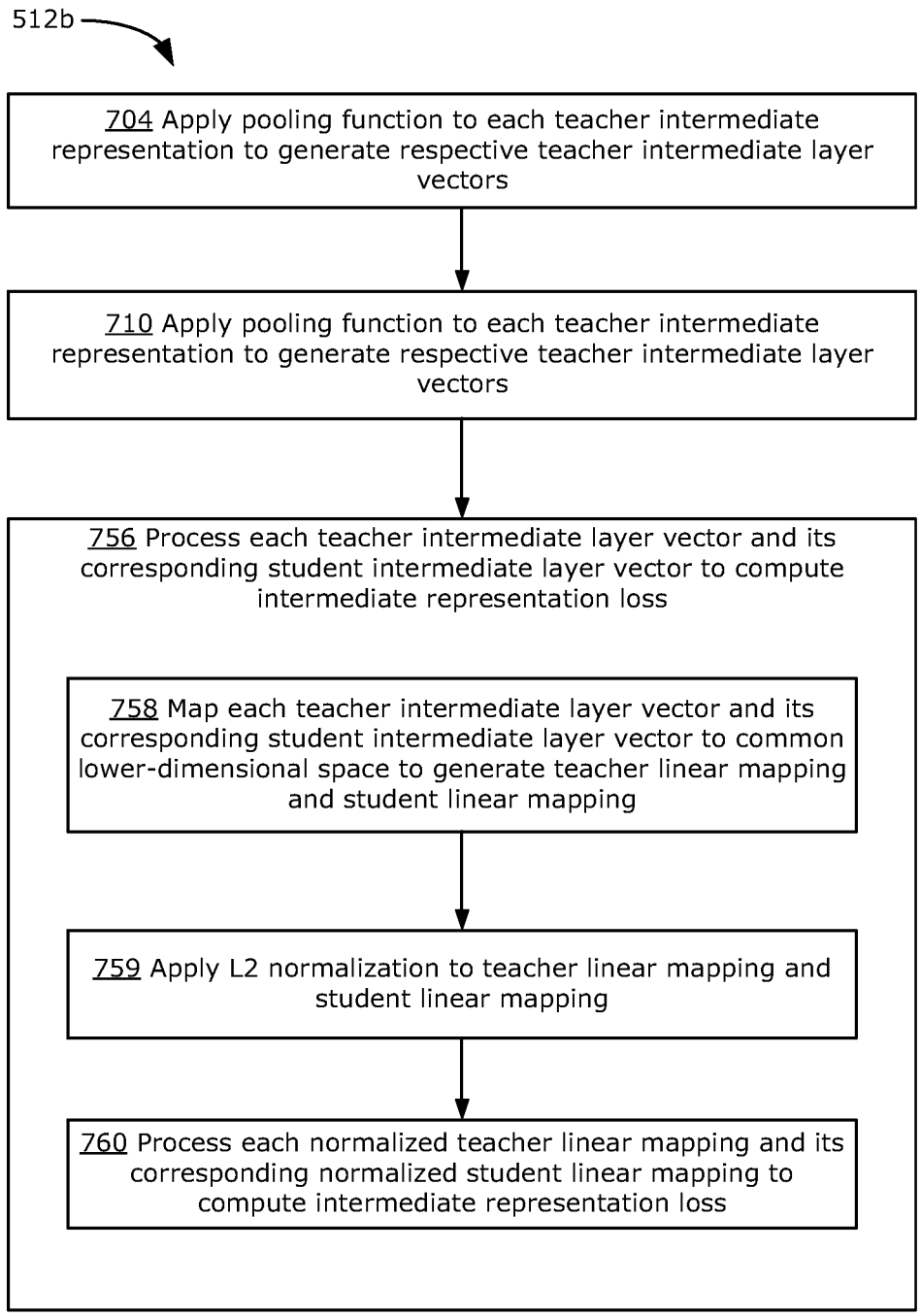
FIG. 7B is a flowchart showing example sub-steps of the intermediate representation loss computation operation of the method of FIG. 5 using the layer-wise intermediate representation loss module of FIG. 4B.

FIG. 7B shows example sub-operations of the intermediate representation loss computation operation 512 of the method of FIG. 5 in a second example embodiment 512b using the layer-wise intermediate representation loss module 222b of FIG. 4B. It will be appreciated that the second example embodiment 512b begins with operations 704 and 710, which are identical to those performed with respect to the first example embodiment 512a.

As in the layer concatenating intermediate representation loss module 222a of FIG. 4A, the m selected intermediate teacher layers and their corresponding set of m intermediate representations 412 are maintained in order, based on their proximity to the input layer. Because p=m, this means that each selected teacher intermediate layer has exactly one corresponding student intermediate layer having an equivalent position in the ordering from 1 to m.

At 756, after the set of m teacher layer vectors 422 and set of m student layer vectors 424 have been generated by the pooling module 404, the loss computation module 408b processes each teacher layer vector and its corresponding student layer vector (i.e. the student layer vector at the same position in the order) to compute the intermediate representation loss 316. Operation 756 includes sub-operations 758, 759, and 760.

At 758, for each teacher layer vector fir of the m teacher layer vectors 422 and its corresponding student layer vector k of the m student layer vectors 424, the loss computation module 408b maps the teacher layer vector and the student layer vector to a common lower-dimensional space using a linear transformation to generate a teacher linear mapping $f(h_i^T)$ and a student linear mapping $g(h_i^S)$ occupying the common lower-dimensional space $R^u$ such that $f(h_i^T), g(h_i^S) \in R^u$. (It will be appreciated that the linear transformation functions f( ) and g( ) used in this example may not be equivalent to those used in the example of FIGS. 4A and 7A.)

At 759, the teacher linear mapping and the student linear mapping are normalized using an L2 normalization function, i.e. the teacher linear mapping and the student linear mapping are normalized with respect to the square root of the sum of the squared vector values.

At 760, the loss computation module 408b processes each normalized teacher vector linear mapping $f(h_i^T)$ and its corresponding normalized student vector linear mapping $g(h_i^S)$ to compute the intermediate representation loss 316. In some examples, the normalization step 759 is considered part of the processing step 760. In the present example, the loss function used may be a layer-wise CRD loss function; in other embodiments it may be one of the other loss functions described above with reference to FIGS. 4A and 7A.

In the present example, the layer-wise CRD loss $L_{CRD}$ can be computed as:

$$L_{CRD} = -\sum_{i}^{m} \alpha_i \log \frac{\exp(\langle f(\overline{h}_{ik}^T), g(\overline{h}_{ik}^S)\rangle/\tau)}{\sum_{j=0}^{K} \exp(\langle f(\overline{h}_{ik}^T), g(\overline{h}_{ij}^S)\rangle/\tau)}$$

wherein $g(\overline{h}_{ik}^S)$ is the student linear mapping at student intermediate layer i for positive sample k, and j≠k are the negative samples in a training batch 302 consisting of K samples. As in the previous example of CRD loss, the objective is to map the student linear mapping $g(\overline{h}_{ik}^S)$ of positive sample k to $f(\overline{h}_{ik}^T)$, and the negative student linear mappings $\{g(\overline{h}_{ij}^S)\}_{j\neq k}^K$ far apart from $f(\overline{h}_{ik}^T)$. The function <.,.> is the cosine similarity between two feature vectors. τ is the temperature parameter that controls the concentration level. $\alpha_i$ is a set of distillation weights for each pair of corresponding teacher and student intermediate layers i, which is a hyper-parameter of the layer-wise intermediate representation loss module 222b (and may be stored in the memory 208). $f(\overline{h}_{ik}^T)$ is the $i^{th}$ teacher linear mapping of positive sample k used for generating the CRD loss. In some embodiments, the teacher linear mappings can be replaced by a different weighted representation of the teacher intermediate layer representations.

The example embodiments described above with reference to the intermediate layer KD system 300 and the two example intermediate representation loss modules 222a, 222b may be able to solve the previously identified problems of intermediate layer selection (the skip and search problems) and/or to improve the generalization behavior of the trained student model 234 by avoiding overfitting. Described embodiments may also provide effective utilization of intermediate layer representations of the teacher (which may be a huge model such as a Generative Pre-trained Transformer (GPT)) to improve the generalization performance of the trained student model, especially when trained on a training dataset 240 of limited size.

Example embodiments described above may be applicable to other knowledge distillation methods, and may be used with deep neural networks trained to perform a range of inference tasks (CV, NLP, etc.).

The example embodiments described above may also be used to further improve KD by augmenting the training dataset using data augmentation. A generator model may be trained to generate additional labeled training data samples (i.e. data samples annotated with semantic labels) that are optimized to improve the effectiveness of the intermediate layer training method 500 described above when added to the training dataset 240.

Figure 8:
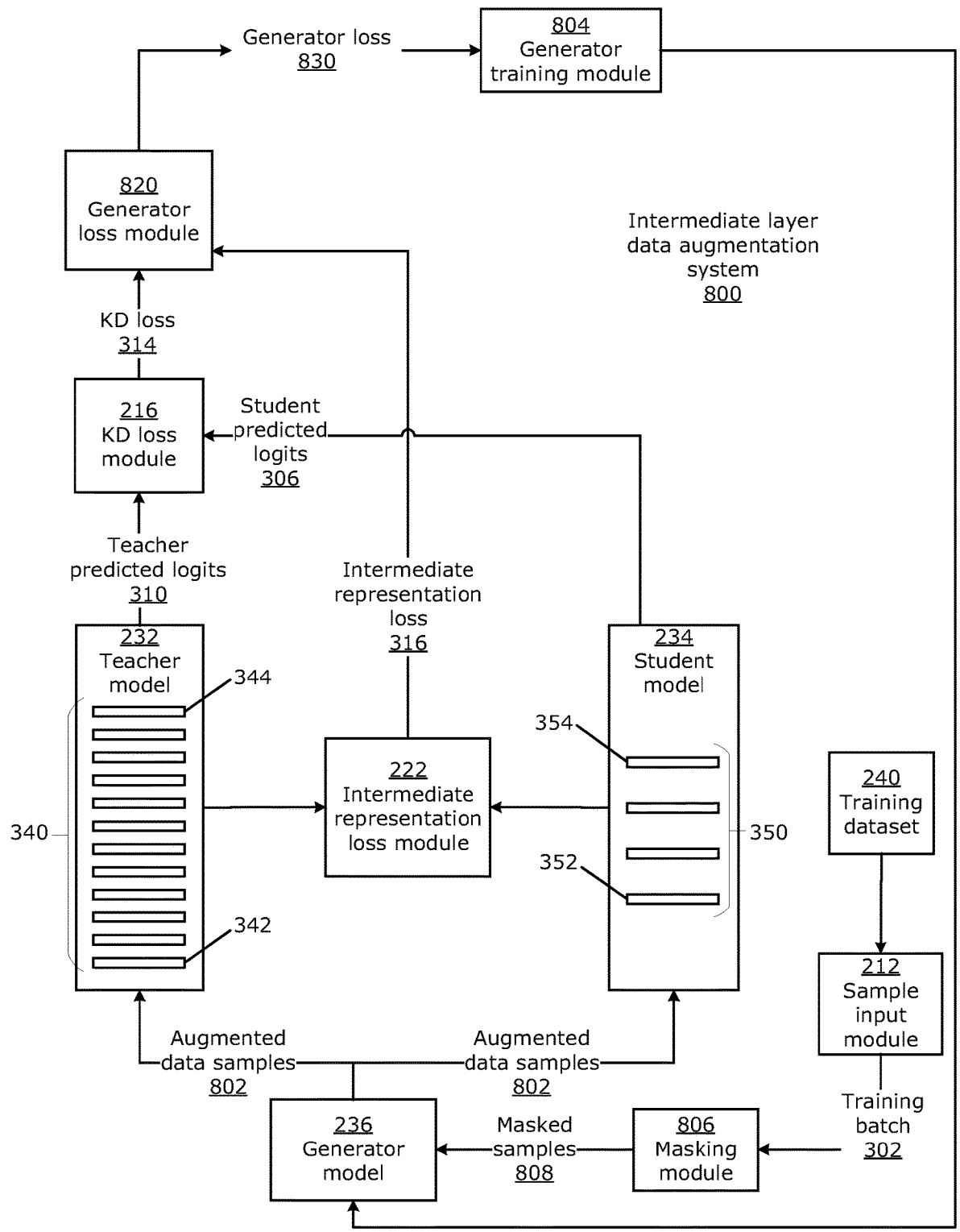
FIG. 8 is a block diagram showing an intermediate layer data augmentation system, according to example embodiments described herein.

FIG. 8 shows an intermediate layer data augmentation system 800 for generating new training labeled training data samples to augment the training dataset 240 to improve the efficacy of KD using intermediate layers. The intermediate layer data augmentation system 800 includes many of the modules and information used by the intermediate layer KD system 300, which perform the same operations as in FIG. 3 unless otherwise specified. A generator loss module 820 generates a generator loss 830 (described below) based on the intermediate representation loss 316 and the KD loss 314. A generator training module 804 receives the generator loss 830 and uses one the generator loss 830 to train the generator model 236 to generate maximally divergent augmented labeled training data samples for the student and teacher models, as described below. The operation of the intermediate layer data augmentation system 800 will be described with reference to a data augmentation method 900 shown at FIG. 9 below.

Figure 9:
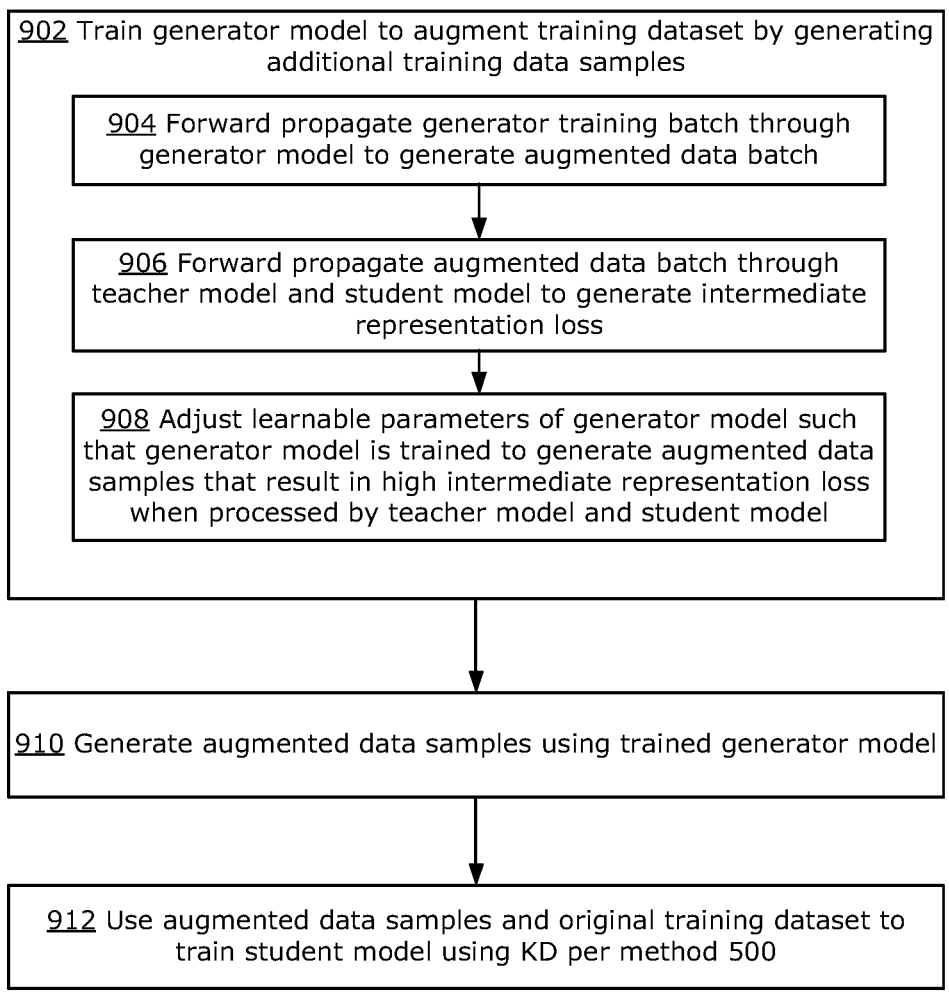
FIG. 9 is a flowchart showing steps of an example method for performing data augmentation as part of the knowledge distillation method of FIG. 5.

FIG. 9 shows an example data augmentation method 900, which may be part of the KD method 500 of FIG. 5. The data augmentation method 900 may be performed prior to the KD method 500, in order to augment the training dataset 240 before the augmented training dataset is used to train the student model 234.

At 902, the generator model 236 is trained to augment the training dataset 240 by generating additional labeled training data samples. This generator training operation 902 may be referred to as a "maximization operation" of the overall min-max approach to data augmentation, because its goal is to train the generator model 236 to generate augmented data samples such that the difference between the outputs of the teacher model 232 and the student model 234 (i.e. the intermediate representations, as well as the predicted logits generated by the output layer) in response to the augmented data samples is maximized.

Prior to beginning data augmentation method 900, the generator model 236 may be a pre-trained masked language model which is trained to predict the masked tokens of sentences (i.e. the input data in labeled training data samples) which are masked by a masking module 806. The masking operation performed by the masking module 806 will be described with references to input data in each labeled training data sample where the input data is a sentence consisting of a sequence of linguistic tokens, e.g. words; however, it will be appreciated that similar techniques can be applied in other domains to other types of input data in each labeled training data sample. The masking module 806 receives the input data of a labeled training data sample (e.g. a sentence) and masks zero or more tokens (e.g. words) of the sentence based on a threshold probability $p_{th}$. I.e., if the input data $X=(x_0, \ldots, x_{L-1})$ of a training data sample then the masking module 806 applies a function $Mask(x_i \in X, p_i)$ to generate masked input data for the training data sample. Batches of labeled training data samples (i.e. training batches 302) obtained from the training dataset 240 are supplied by the sample input module 212 to the masking module 806. The masking module 806 masks the input data of each labeled training data sample (e.g. tokens (i.e. words in the sentence)) based on probability $p_i$ chosen from a uniform distribution p~unif(0,1). The tokens are masked if $p_i < p_{th}$. Otherwise, the original tokens are used. The masking module 806 outputs the masked samples 808 (each masked sample being a sentence with zero or more tokens masked) to the generator model 236.

The generator model 236 is pre-trained to guess the masked tokens (e.g. words) in each masked sample 808 (e.g. sentence) X, thereby generating a reconstructed sentence X'. The generator model 236 is further trained during the maximization step 902 to reconstruct the masked samples 808 in such a way that the reconstructed masked samples (i.e. the input data of the augmented data samples 802) maximize the divergence between predictions (i.e. the student predicted logits 306) output by the student model 234 and the predictions (i.e. teacher predicted logits 310) output by teacher model 232 based on receiving the reconstructed masked samples as input.

The Gumbel-Softmax trick is applied instead of the softmax output (i.e. the normalized predicted logits) of the generator model 236 to inhibit non-differentiability of discrete tokens. The Gumbel-Softmax is described by E. Jang, S. Gu, and B. Poole. 2016. "Categorical reparameterization with gumbel-softmax". arXiv preprint arXiv:1611.01144. The Gumbel-Softmax Distribution trick is a way of generating a differentiable approximation to sampling from an argmax, which is ordinarily non-differentiable. The Gumbel- Softmax Distribution process is used to approximate the sampling process of discrete data. The neural network of the generator model 236 can then be trained using backpropagation. The Gumbel-Softmax may assist with backpropagation of a differentiable approximation of an argmax function. That is:

$$G_\varphi(X^m) = \sigma_{Gumbel}(\sigma(z_\varphi(X^m)))$$

where $$\sigma_{Gumbel}(\sigma(z_i)) = \frac{\exp\bigl((\log(\sigma(z_i)) + g_i)/\tau\bigr)}{\sum_{j=1}^{K} \exp\bigl((\log(\sigma(z_j)) + g_j)/\tau\bigr)}, \; g_i \sim Gumbel(0,1),$$

and $X^m$ is the output of applying the mask function Mask $(x_i \in X, p_i)$.

In the forward pass (i.e. forward propagation), the argmax function is then applied to the refactored sampling of the softmax output of the generator model 236 generate an adversarial text X' as X'=argmax($G_\varphi(X^m)$), which constitutes input data for an augmented data sample.

Thus, maximization step 902 includes sub-operations 904, 906, and 908. At sub-operation 904, a generator training batch (shown as masked samples 808) is forward propagated through the generator model 236. The generator training batch includes one or more masked samples 808, each masked sample being the input data of one of the training data samples of training batch 302 selected from the training dataset 240, masked by the masking module 806. The masking module 806 processes the input data of each labeled training data sample of the generator training batch by masking the input data of each labeled training data sample of the training batch 302 to generate the masked samples 808 as described above. The generator model 236 then performs an inference task to reconstruct the masked portion each masked sample to generate a respective augmented data sample 802 (denoted as adversarial text X'); collectively, the training data samples of the generator training batch are processed to generate an augmented data batch.

At sub-operation 906, the augmented data batch (shown as augmented data samples 802) is forward propagated through the teacher model 232 and the student model 234 to generate the intermediate representation loss 316 (i.e. as described above with reference to FIGS. 3 and 4A or 4B, wherein the augmented data batch is treated as a training batch). The augmented data batch is treated and processed as the training batch in the examples described above with reference to FIGS. 5, 4A, and 4B. Sub-step 906 may use either the layer concatenating intermediate representation KD system 222a, the layer-wise intermediate representation KD system 222b, or any other suitable method or system for generating the intermediate representation loss.

At 908, values of a plurality of learnable parameters of the generator model 236 are adjusted such that the generator model 236 is trained to generate augmented data samples that result in high intermediate representation loss when processed by the teacher model 232 and student model 234. The generator loss 830 is generated by the generator loss module 820 based on the KD loss 314 and intermediate representation loss 316. The generator loss 830, denoted $L_{Generator}$, may be computed as:

$$L_{Generator} = -(\alpha_1 L_{KD} + \alpha_2 L_{CRD})$$

wherein weights $\alpha_1$ and $\alpha_2$ are hyperparameter with pre-defined values stored in the memory 208, and $L_{KD}$ and $L_{CRD}$ are KD loss 314 and intermediate representation loss 316, respectively, as defined above with reference to FIG. 4A or 4B (depending on the embodiment used for computing intermediate representation loss 316). The generator loss 830 is then backward propagated through the generator model 236 by the generator training module 804 to adjust values of the learnable parameters of the generator model 236 to maximize (not minimize) the generator loss. Thus, the generator model 236 is trained to generate augmented data samples X' that maximize the divergence between the teacher model 232 and student model 234 as shown by the intermediate representation loss 316 and KD loss 314.

The maximization operation 902 may be repeated until a training metric is satisfied, such as training the generator model 236 with a fixed number of generator training batches, training the generator model 236 until it converges as determined by a convergence threshold, etc.

At 910, after the generator model 236 has been trained, the generator model 236 may be used to generate one or more augmented data samples. These augmented data samples may be added to the training dataset 240 to augment the training dataset 240 with the one or more augmented data samples optimized to maximize teacher-student divergence as described above. In some embodiments, the augmented data samples generated during the maximization operation 902 may be used to augment the training dataset 240; in some such embodiments, operation 910 may be omitted.

The method 900 then proceeds to a minimization operation 912, wherein the augmented data samples are used, along with the original labeled training data samples in the training dataset 240, to train the student model 234, seeking to adjust values of the learnable parameters of the student model 234 to minimize the difference between the teacher and the student outputs (i.e. the intermediate representations and the predicted logits) and to minimize the ground truth loss 312. Thus, the first training batch and/or second training batch 302 used in method 500 may include one or more of the augmented data samples generated by the generator model 236. Minimization operation 912 proceeds as method 500 described above, using the intermediate layer KD system 300, with the modification that the training dataset 240 has been augmented by the generator model 236.

Specifically, in some embodiments, method 900 may be repeated before each training epoch of method 500. The data augmentation method 900 may thus re-train the generator with respect to each new subset of teacher intermediate layers selected for a new training epoch before augmenting the training dataset 240 for use during the training epoch of method 500. Thus, method 900 may be performed between operations 502 and 504, again between operations 516 and the repeat of operation 504, and so on, such that the maximization operation 902 and the minimization operation 912 (i.e. operations 504-516) alternate for each training epoch.

By augmenting the training dataset 240 with augmented data samples optimized to maximize teacher-student divergence, a more diverse training dataset is used to train the student model 234. Because the loss margin is maximized based on the intermediate layer representations and the logit distillation, the augmented data samples may assist the student model 234 in converging with the teacher model 232 in domains where it otherwise would have diverged significantly from the teacher model 232. Using this data augmentation method 900, the student model 234 may be able to achieve greater fidelity to the teacher model 232, with improved generalization behavior.

Some embodiments described herein may be used to compress a variety of large neural networks, pre-trained to perform CV or NLP tasks, with minimal loss of accuracy. Example embodiments may thereby be used to train small and accurate models which can be run on computing devices having limited computing resources, such as edge devices (i.e. electronic devices having limited computing resources, such as mobile phones). The flexibility and generalizability of the described examples makes the Dropout-KD approach described herein easy to use in different types of KD projects. Some embodiments may provide a very efficient approach to KD using intermediate layer information that incorporates information from all intermediate layers of the teacher model, thereby improving generalization and performance of the trained student model. Example embodiments may thus provide for efficient distillation of knowledge from extremely large models trained using machine learning to perform CV or NLP tasks, such as NLP model GPT-2.

General

Although the present disclosure describes methods and processes with steps in a certain order, one or more steps of the methods and processes may be omitted or altered as appropriate. One or more operarations may take place in an order other than that in which they are described, as appropriate. Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for using knowledge distillation to train a student model, comprising a first number of student intermediate layers, to perform an inference task, the method comprising:

selecting a first subset of intermediate layers of a teacher model pre-trained to perform the inference task, the number of teacher intermediate layers in the first subset being a second number that is equal to or smaller than the first number;

performing a plurality of training epochs, using a training dataset, wherein performing each training epoch comprises:

forward propagating through the teacher model each labeled data sample of a training batch obtained from the training dataset to obtain teacher prediction information, the training batch comprising a plurality of labeled data samples;

forward propagating each training data sample of the training batch through the student model to obtain student prediction information;

for each training data sample in the training batch:
obtaining, from each teacher intermediate layer of the first subset, a teacher intermediate representation generated by the respective teacher intermediate layer based on the training data sample; and
obtaining, from each student intermediate layer, a student intermediate representation generated by the respective student intermediate layer based on the training data sample;

processing the teacher intermediate representations and the student intermediate representations for the training batch to compute an intermediate representation loss representing a difference between the teacher intermediate representations and the student intermediate representations;

processing the teacher prediction information and the student prediction information for the training batch to compute a knowledge distillation loss representing a difference between the teacher prediction information and the student prediction information;

computing a weighted loss based on the intermediate representation loss and the knowledge distillation loss;

processing the weighted loss to adjust a plurality of learnable parameters of the student model;

selecting a second subset of intermediate layers of the teacher model, the number of intermediate layers in the second subset being the second number; and performing a second training epoch, using the training dataset, by repeating the steps of the first training epoch using the second subset of intermediate layers of the teacher model.

2. The method of claim 1, wherein performing each training epoch further comprises:

processing the student prediction information and ground truth labels for each labeled training data sample in the training batch to compute a ground truth loss;

wherein computing the weighted loss is further based on the ground truth loss.

3. The method of claim 1, wherein each teacher intermediate representation and each student intermediate representation comprises the output of its respective intermediate layer.

4. The method of claim 1, wherein the intermediate representation loss is a contrastive representation distillation loss.

5. The method of claim 1, wherein processing the teacher intermediate representations and the student intermediate representations for the training batch comprises:
processing the teacher intermediate representations to generate a concatenated teacher representation;
processing the student intermediate representations to generate a concatenated student representation; and
processing the concatenated teacher representation and the concatenated student representation to compute the intermediate representation loss.

6. The method of claim 5, wherein:
processing the teacher intermediate representations to generate a concatenated teacher representation comprises:
for each teacher intermediate representation, applying a pooling function to the teacher intermediate representation to generate a teacher layer vector; and
concatenating the second number of layer vectors corresponding to the second number of teacher intermediate layers to generate the concatenated teacher representation such that the layer vectors are arranged in an order corresponding to an order of the teacher intermediate layers based on proximity to an input layer of the teacher model; and
processing the student intermediate representations to generate a concatenated student representation comprises:
for each student intermediate representation, applying a pooling function to the student intermediate representation to generate a student layer vector; and
concatenating the first number of layer vectors corresponding to the first number of student intermediate layers to generate the concatenated student representation such that the layer vectors are arranged in an order corresponding to an order of the student intermediate layers based on proximity to an input layer of the student model.

7. The method of claim 6, wherein processing the concatenated teacher representation and the concatenated student representation to compute an intermediate representation loss comprises:
mapping the concatenated teacher representation and the concatenated student representation to a common lower-dimensional space using a linear transformation to generate a teacher linear mapping and a student linear mapping; and
processing the teacher linear mapping and the student linear mapping to compute the intermediate representation loss.

8. The method of claim 1, wherein:
the first number denoting the number of student intermediate layers is equal to the second number denoting the number of teacher intermediate layers;
the teacher intermediate layers of the first subset are ordered based on their proximity to a teacher input layer, and the student intermediate layers are ordered based on their proximity to a student input layer, such that each teacher intermediate layer of the first subset corresponds to a respective student intermediate layer having a corresponding position in order; and
processing the teacher intermediate representations and the student intermediate representations for the training batch to compute the intermediate representation loss comprises:
for each teacher intermediate representation, applying a pooling function to the teacher intermediate representation to generate a teacher layer vector;
for each student intermediate representation, applying a pooling function to the student intermediate representation to generate a student layer vector; and
processing each teacher layer vector and its corresponding student layer vector to compute the intermediate representation loss.

9. The method of claim 8, wherein processing each teacher layer vector and its corresponding student layer vector to compute the intermediate representation loss comprises:
for each teacher layer vector and its corresponding student layer vector, mapping the teacher layer vector and the student layer vector to a common lower-dimensional space using a linear transformation to generate a teacher vector linear mapping and a student vector linear mapping; and
processing each teacher vector linear mapping and its corresponding student vector linear mapping to compute the intermediate representation loss.

10. The method of claim 1, further comprising:
training a generator model to augment the training dataset by generating additional training data samples, the training comprising:
propagating forward through the generator model a generator training batch of the training dataset, comprising one or more training data samples, to generate an augmented data batch comprising one or more augmented data samples;
propagating the augmented data batch forward through the teacher model and the student model to generate the intermediate representation loss; and
adjusting a plurality of learnable parameters of the generator model such that the generator model is trained to generate augmented data samples that result in high intermediate representation loss when processed by the teacher model and student model; and
generating one or more augmented data samples using the trained generator model;
wherein the first training batch or second training batch comprises the one or more augmented data samples.

11. A device, comprising:
a processor; and
a memory having stored thereon instructions which, when executed by the processor, cause the device to use knowledge distillation to train a student model, comprising a first number of student intermediate layers, to perform an inference task, by:
selecting a first subset of intermediate layers of a teacher model pre-trained to perform the inference task, the number of teacher intermediate layers in the first subset being a second number that is equal to or smaller than the first number;
performing a plurality of training epochs, using a training dataset, wherein performing each training epoch comprises:
forward propagating through the teacher model each labeled data sample of a training batch obtained from the training dataset to obtain teacher prediction information, the training batch comprising a plurality of labeled data samples;
forward propagating each training data sample of the training batch through the student model to obtain student prediction information;
for each training data sample in the training batch:
obtaining, from each teacher intermediate layer of the first subset, a teacher intermediate representation generated by the respective teacher intermediate layer based on the training data sample; and obtaining, from each student intermediate layer, a student intermediate representation generated by the respective student intermediate layer based on the training data sample;

processing the teacher intermediate representations and the student intermediate representations for the training batch to compute an intermediate representation loss representing a difference between the teacher intermediate representations and the student intermediate representations;

processing the teacher prediction information and the student prediction information for the training batch to compute a knowledge distillation loss representing a difference between the teacher prediction information and the student prediction information;

computing a weighted loss based on the intermediate representation loss and the knowledge distillation loss;

processing the weighted loss to adjust a plurality of learnable parameters of the student model;

selecting a second subset of intermediate layers of the teacher model, the number of intermediate layers in the second subset being the second number; and performing a second training epoch, using the training dataset, by repeating the steps of the first training epoch using the second subset of intermediate layers of the teacher model.

12. The device of claim 11, wherein performing each training epoch further comprises:
processing the student prediction information and ground truth labels for each labeled training data sample in the training batch to compute a ground truth loss;
wherein computing the weighted loss is further based on the ground truth loss.

13. The device of claim 11, wherein each teacher intermediate representation and each student intermediate representation comprises the output of its respective intermediate layer.

14. The device of claim 11, wherein the intermediate representation loss is a contrastive representation distillation loss.

15. The device of claim 11, wherein processing the teacher intermediate representations and the student intermediate representations for the training batch comprises:
processing the teacher intermediate representations to generate a concatenated teacher representation;
processing the student intermediate representations to generate a concatenated student representation; and
processing the concatenated teacher representation and the concatenated student representation to compute the intermediate representation loss.

16. The device of claim 15, wherein:
processing the teacher intermediate representations to generate a concatenated teacher representation comprises:
for each teacher intermediate representation, applying a pooling function to the teacher intermediate representation to generate a teacher layer vector; and
concatenating the second number of layer vectors corresponding to the second number of teacher intermediate layers to generate the concatenated teacher representation such that the layer vectors are arranged in an order corresponding to an order of the teacher intermediate layers based on proximity to an input layer of the teacher model;

processing the student intermediate representations to generate a concatenated student representation comprises:
for each student intermediate representation, applying a pooling function to the student intermediate representation to generate a student layer vector; and
concatenating the first number of layer vectors corresponding to the first number of student intermediate layers to generate the concatenated student representation such that the layer vectors are arranged in an order corresponding to an order of the student intermediate layers based on proximity to an input layer of the student model; and processing the concatenated teacher representation and the concatenated student representation to compute an intermediate representation loss comprises:
mapping the concatenated teacher representation and the concatenated student representation to a common lower-dimensional space using a linear transformation to generate a teacher linear mapping and a student linear mapping; and
processing the teacher linear mapping and the student linear mapping to compute the intermediate representation loss.

17. The device of claim 11, wherein:
the first number denoting the number of student intermediate layers is equal to the second number denoting the number of teacher intermediate layers;
the teacher intermediate layers of the first subset are ordered based on their proximity to a teacher input layer, and the student intermediate layers are ordered based on their proximity to a student input layer, such that each teacher intermediate layer of the first subset corresponds to a respective student intermediate layer having a corresponding position in order;
processing the teacher intermediate representations and the student intermediate representations for the training batch to compute the intermediate representation loss comprises:
for each teacher intermediate representation, applying a pooling function to the teacher intermediate representation to generate a teacher layer vector;
for each student intermediate representation, applying a pooling function to the student intermediate representation to generate a student layer vector; and
processing each teacher layer vector and its corresponding student layer vector to compute the intermediate representation loss; and
processing each teacher layer vector and its corresponding student layer vector to compute the intermediate representation loss comprises:
for each teacher layer vector and its corresponding student layer vector, mapping the teacher layer vector and the student layer vector to a common lower-dimensional space using a linear transformation to generate a teacher vector linear mapping and a student vector linear mapping; and
processing each teacher vector linear mapping and its corresponding student vector linear mapping to compute the intermediate representation loss.

18. The device of claim 11, further comprising:
training a generator model to augment the training dataset by generating additional training data samples, the training comprising:

propagating forward through the generator model a generator training batch of the training dataset, comprising one or more training data samples, to generate an augmented data batch comprising one or more augmented data samples;

propagating the augmented data batch forward through the teacher model and the student model to generate the intermediate representation loss; and adjusting a plurality of learnable parameters of the generator model such that the generator model is trained to generate augmented data samples that result in high intermediate representation loss when processed by the teacher model and student model; and generating one or more augmented data samples using the trained generator model;

wherein the first training batch or second training batch comprises the one or more augmented data samples.

19. A non-transitory processor-readable medium containing instructions which, when executed by a processor of a device, cause the device to use knowledge distillation to train a student model, comprising a first number of student intermediate layers, to perform an inference task, by:

selecting a first subset of intermediate layers of a teacher model pre-trained to perform the inference task, the number of teacher intermediate layers in the first subset being a second number that is equal to or smaller than the first number;

performing a plurality of training epochs, using a training dataset, wherein performing each training epoch comprises:

forward propagating through the teacher model each labeled data sample of a training batch obtained from the training dataset to obtain teach prediction information, the training batch comprising a plurality of labeled data samples;

forward propagating each training data sample of the training batch through the student model to obtain student prediction information;

for each training data sample in the training batch:

obtaining, from each teacher intermediate layer of the first subset, a teacher intermediate representation generated by the respective teacher intermediate layer based on the training data sample; and obtaining, from each student intermediate layer, a student intermediate representation generated by the respective student intermediate layer based on the training data sample;

processing the teacher intermediate representations and the student intermediate representations for the training batch to compute an intermediate representation loss representing a difference between the teacher intermediate representations and the student intermediate representations;

processing the teacher prediction information and the student prediction information for the training batch to compute a knowledge distillation loss representing a difference between the teacher prediction information and the student prediction information;

computing a weighted loss based on the intermediate representation loss and the knowledge distillation loss;

processing the weighted loss to adjust a plurality of learnable parameters of the student model;

selecting a second subset of intermediate layers of the teacher model, the number of intermediate layers in the second subset being the second number; and performing a second training epoch, using the training dataset, by repeating the steps of the first training epoch using the second subset of intermediate layers of the teacher model.

20. The non-transitory processor-readable medium of claim 19, wherein performing each training epoch further comprises:

processing the student prediction information and ground truth labels for each labeled training data sample in the training batch to compute a ground truth loss;

wherein computing the weighted loss is further based on the ground truth loss.

* * * * *